US010259512B2

(12) United States Patent
Rosenboom

(10) Patent No.: US 10,259,512 B2
(45) Date of Patent: *Apr. 16, 2019

(54) VEHICLE TRACK ASSEMBLY

(71) Applicant: Camso Inc., Magog (CA)

(72) Inventor: Lyn Rosenboom, Clifton, IL (US)

(73) Assignee: Camso Inc., Magog, QC (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/246,704

(22) Filed: Aug. 25, 2016

(65) Prior Publication Data

US 2016/0362148 A1 Dec. 15, 2016

Related U.S. Application Data

(63) Continuation of application No. 14/287,794, filed on May 27, 2014, now Pat. No. 9,440,691, which is a
(Continued)

(51) Int. Cl.
*B62D 55/08* (2006.01)
*A01B 51/04* (2006.01)
(Continued)

(52) U.S. Cl.
CPC ............. *B62D 55/08* (2013.01); *A01B 51/04* (2013.01); *A01B 73/02* (2013.01); *A01B 76/00* (2013.01);
(Continued)

(58) Field of Classification Search
CPC ....... A01B 51/04; A01B 73/02; A01B 73/065; A01B 76/00; B60G 99/00; B62D 55/00;
(Continued)

(56) References Cited

U.S. PATENT DOCUMENTS 1,356,038 A 10/1920 Carey
1,368,652 A 2/1921 Pennington et al.
(Continued)

FOREIGN PATENT DOCUMENTS

CN 202080289 U 12/2011

OTHER PUBLICATIONS

Restriction Requirement dated Aug. 9, 2002 in connection with U.S. Appl. No. 09/847,264, 4 pages.
(Continued)

*Primary Examiner* — Jamie L McGowan
(74) *Attorney, Agent, or Firm* — Fish & Richardson P.C.

(57) ABSTRACT

A vehicle wheel assembly is provided which includes a vehicle frame having a first axle, a wheel assembly having a housing with an aperture engaging the first axle and enabling the wheel assembly to pivot in a first plane about a first axis formed by the first axle. A cylindrical member is carried by the housing of the wheel assembly, the cylindrical member and housing are arranged perpendicular to the first axle. A first wheel is pivotably connected to a first portion of the cylindrical member and a second wheel is pivotably connected to a second portion of the cylindrical member. The first wheel and second wheel independently pivot in a second plane about a second axis formed by the cylindrical member. The first axis is arranged perpendicular to the second axis and the first plane is arranged perpendicular to the second plane.

81 Claims, 20 Drawing Sheets

Related U.S. Application Data continuation of application No. 13/707,515, filed on Dec. 6, 2012, now Pat. No. 8,763,716, which is a continuation of application No. 12/708,062, filed on Feb. 18, 2010, now Pat. No. 8,342,257, which is a continuation of application No. 09/847,264, filed on May 2, 2001, now Pat. No. 7,740,084.

(60) Provisional application No. 60/201,085, filed on May 2, 2000.

(51) Int. Cl.
*A01B 73/02* (2006.01)
*B60G 99/00* (2010.01)
*B62D 55/14* (2006.01)
*B62D 55/06* (2006.01)
*B62D 55/24* (2006.01)
*A01B 76/00* (2006.01)
*A01B 73/06* (2006.01)

(52) U.S. Cl.
CPC .............. *B60G 99/00* (2013.01); *B62D 55/06* (2013.01); *B62D 55/14* (2013.01); *B62D 55/24* (2013.01); *A01B 73/065* (2013.01)

(58) Field of Classification Search
CPC ........ B62D 55/06; B62D 55/08; B62D 55/10; B62D 55/14; B62D 55/24; B62B 55/08
See application file for complete search history.

(56) References Cited

U.S. PATENT DOCUMENTS

| | | | |
|---|---|---|---|
| 1,451,627 A | 4/1923 | Munson | |
| 1,539,582 A | 5/1925 | Landry | |
| 1,585,100 A * | 5/1926 | Kegresse | B62D 55/108 |
| | | | 305/132 |
| 1,665,470 A | 4/1928 | Norelius | |
| 1,725,817 A * | 8/1929 | Mitchell | B62D 55/10 |
| | | | 280/81.1 |
| 1,980,276 A * | 11/1934 | Kegresse | B62D 55/104 |
| | | | 180/9.58 |
| 1,990,900 A | 2/1935 | Glasier | |
| 2,052,068 A | 8/1936 | Ziegler | |
| 2,345,158 A | 3/1944 | Schröter et al. | |
| 2,442,354 A * | 6/1948 | Gordon, Jr. | B62D 55/108 |
| | | | 280/683 |
| 2,467,947 A | 4/1949 | Skelton | |
| 2,726,904 A * | 12/1955 | Bekker | B62D 55/20 |
| | | | 305/160 |
| 2,749,189 A * | 6/1956 | France | B62M 27/02 |
| | | | 180/190 |
| 2,753,190 A | 7/1956 | Hooven | |
| 3,170,532 A | 2/1965 | Boppart | |
| 3,216,520 A * | 11/1965 | Blonsky | B62D 55/06 |
| | | | 180/6.7 |
| 3,275,386 A * | 9/1966 | Bexten | B62D 55/1083 |
| | | | 280/81.1 |
| 3,292,943 A * | 12/1966 | Crockett | B60G 9/02 |
| | | | 280/104 |
| 3,333,867 A | 8/1967 | Schultze | |
| 3,343,889 A | 9/1967 | Bexten | |
| 3,346,306 A | 10/1967 | Siber | |
| 3,357,751 A * | 12/1967 | Brown | B62D 55/04 |
| | | | 305/159 |
| 3,412,820 A * | 11/1968 | Wachholz | B62K 13/00 |
| | | | 180/185 |
| 3,455,405 A | 7/1969 | Parent | |
| 3,506,079 A | 4/1970 | Madler et al. | |
| 3,539,170 A | 11/1970 | Hamel | |
| 3,556,455 A | 1/1971 | Storm et al. | |
| 3,565,198 A | 2/1971 | Ames | |
| 3,613,810 A | 10/1971 | Hetteen et al. | |
| 3,688,858 A | 9/1972 | Jespersen | |
| 3,826,325 A | 7/1974 | Purcell et al. | |
| 3,828,874 A | 8/1974 | Council | |
| 3,837,714 A | 9/1974 | Russ, Sr. | |
| 3,841,424 A * | 10/1974 | Purcell | B62D 55/08 |
| | | | 180/9.5 |
| 3,860,079 A | 1/1975 | Hoffman | |
| 3,889,769 A * | 6/1975 | Blomstrom | B62D 55/0842 |
| | | | 180/9.5 |
| 3,948,110 A * | 4/1976 | Lassanske | B62D 55/12 |
| | | | 305/178 |
| 3,951,483 A | 4/1976 | Nakamura | |
| 4,019,268 A | 4/1977 | Waterman | |
| 4,069,883 A | 1/1978 | Cousineau | |
| 4,087,135 A | 5/1978 | Unruh | |
| 4,166,511 A * | 9/1979 | Stedman | B62D 55/065 |
| | | | 180/9.5 |
| 4,230,199 A | 10/1980 | Stedman | |
| 4,420,272 A | 12/1983 | Ingalls et al. | |
| 4,537,267 A | 8/1985 | Satzler | |
| 4,583,791 A | 4/1986 | Nagata et al. | |
| 4,647,116 A * | 3/1987 | Trask | B60K 17/02 |
| | | | 305/132 |
| RE32,442 E | 6/1987 | Satzler | |
| 4,681,177 A | 7/1987 | Zborowski | |
| 4,781,257 A | 11/1988 | Gee et al. | |
| 4,838,373 A * | 6/1989 | Price | B62D 55/0842 |
| | | | 180/9.46 |
| 4,874,052 A | 10/1989 | Purcell et al. | |
| 4,881,609 A | 11/1989 | Purcell et al. | |
| 4,932,677 A | 6/1990 | Shustack | |
| 4,936,639 A | 6/1990 | Pohjola | |
| 4,940,002 A | 7/1990 | Bien | |
| 4,966,242 A * | 10/1990 | Baillargeon | B62D 55/0655 |
| | | | 180/242 |
| 5,127,714 A | 7/1992 | Satzler | |
| 5,168,632 A | 12/1992 | Rimlinger, Jr. | |
| 5,191,951 A * | 3/1993 | Bargfrede | B62D 55/30 |
| | | | 180/9.1 |
| 5,286,044 A | 2/1994 | Satzler et al. | |
| 5,312,176 A | 5/1994 | Crabb | |
| 5,373,909 A * | 12/1994 | Dow | B62D 55/244 |
| | | | 180/235 |
| 5,409,305 A * | 4/1995 | Nagorcka | B62D 55/084 |
| | | | 180/9.52 |
| 5,451,135 A | 9/1995 | Schempf et al. | |
| 5,452,949 A * | 9/1995 | Kelderman | B62D 49/0635 |
| | | | 180/9.44 |
| 5,494,125 A | 2/1996 | Gustin et al. | |
| 5,531,282 A | 7/1996 | Jennen | |
| 5,566,773 A * | 10/1996 | Gersmann | B62D 55/12 |
| | | | 180/9.5 |
| 5,639,148 A * | 6/1997 | Sheidler | B62D 55/084 |
| | | | 305/116 |
| 5,671,819 A * | 9/1997 | Kendall | B62D 55/30 |
| | | | 180/9.1 |
| 5,829,848 A | 11/1998 | Kelderman | |
| 5,899,542 A | 5/1999 | Lykken et al. | |
| 5,899,543 A | 5/1999 | Lykken et al. | |
| 5,927,412 A | 7/1999 | Crabb | |
| 5,954,148 A | 9/1999 | Okumura et al. | |
| 5,988,775 A | 11/1999 | Nordberg | |
| 6,125,956 A * | 10/2000 | Gignac | 180/9.1 |
| 6,129,426 A * | 10/2000 | Tucker | B62D 55/065 |
| | | | 305/136 |
| 6,131,833 A | 10/2000 | Chapman | |
| 6,135,220 A * | 10/2000 | Gleasman | B62D 55/10 |
| | | | 180/9.1 |
| 6,176,334 B1 | 1/2001 | Lorenzen | |
| 6,244,613 B1 | 6/2001 | Renger | |
| 6,249,994 B1 | 6/2001 | Oertley | |
| 6,267,459 B1 | 7/2001 | Becker et al. | |
| 6,273,530 B1 | 8/2001 | Johnson et al. | |
| 6,289,995 B1 | 9/2001 | Fuller | |
| 6,318,484 B2 | 11/2001 | Lykken et al. | |
| 6,386,653 B1 | 5/2002 | Brandenburger | |
| 6,502,840 B1 | 1/2003 | Leyonhjelm et al. | |
| 6,604,796 B2 | 8/2003 | Boyum | |

(56) References Cited

U.S. PATENT DOCUMENTS

| | | | |
|---|---|---|---|
| 6,607,256 B2 | 8/2003 | Yoshida et al. | |
| 6,640,915 B2 | 11/2003 | Haringer | |
| 6,641,235 B2 | 11/2003 | Boyum | |
| 6,712,549 B2* | 3/2004 | Roth | B62D 55/104 404/118 |
| 6,716,012 B2* | 4/2004 | Yovichin | B62D 55/244 249/184 |
| RE38,858 E | 11/2005 | Grawey et al. | |
| 6,959,936 B2 | 11/2005 | Anderson et al. | |
| 7,370,918 B2* | 5/2008 | Tucker | B62D 55/065 305/100 |
| 7,380,892 B2* | 6/2008 | Rosenboom | B62D 55/104 180/9.46 |
| 7,740,084 B2 | 6/2010 | Rosenboom | |
| 8,342,257 B2 | 1/2013 | Rosenboom | |
| 8,763,716 B2 | 7/2014 | Rosenboom | |
| 9,580,121 B2 | 2/2017 | Reshad et al. | |
| 2002/0101052 A1 | 8/2002 | Panizzolo | |
| 2003/0070862 A1 | 4/2003 | Tartara | |
| 2005/0072607 A1* | 4/2005 | Tucker | B62D 55/065 180/9.1 |
| 2006/0220456 A1 | 10/2006 | Sugahara | |
| 2006/0267405 A1* | 11/2006 | Tucker | B62D 55/065 305/115 |
| 2007/0046100 A1 | 3/2007 | McGilvrey et al. | |
| 2009/0105059 A1 | 4/2009 | Dorry et al. | |
| 2009/0206655 A1 | 8/2009 | Song | |
| 2010/0033010 A1 | 2/2010 | Shimozono | |
| 2010/0295367 A1 | 11/2010 | Kim et al. | |
| 2011/0046832 A1 | 2/2011 | Francoeur | |
| 2013/0134772 A1 | 5/2013 | Dandurand et al. | |
| 2016/0059779 A1 | 3/2016 | Vandendriessche | |
| 2016/0362151 A1 | 12/2016 | Jee et al. | |
| 2017/0274946 A1 | 9/2017 | Vik et al. | |

OTHER PUBLICATIONS

Restriction Requirement dated Nov. 18, 2002 in connection with U.S. Appl. No. 09/847,264, 5 pages.
Non-Final Office Action dated Jan. 27, 2003 in connection with U.S. Appl. No. 09/847,264, 4 pages.
Final Office Action dated Mar. 16, 2004 in connection with U.S. Appl. No. 09/847,264, 5 pages.
Non-Final Office Action dated Aug. 1, 2005 in connection with U.S. Appl. No. 09/847,264, 5 pages.
Non-Final Office Action dated Oct. 17, 2005 in connection with U.S. Appl. No. 10/776,086, 7 pages.
Final Office Action dated May 1, 2006 in connection with U.S. Appl. No. 09/847,264, 8 pages.
Non-Final Office Action dated May 22, 2006 in connection with U.S. Appl. No. 10/776,086, 5 pages.
Non-Final Office Action dated Nov. 9, 2006 in connection with U.S. Appl. No. 09/847,264, 5 pages.
Non-Final Office Action dated Dec. 13, 2006 in connection with U.S. Appl. No. 10/776,086, 6 pages.
Final Office Action dated Jun. 4, 2007 in connection with U.S. Appl. No. 10/776,086, 6 pages.
Final Office Action dated Jun. 28, 2007 in connection with U.S. Appl. No. 09/847,264, 5 pages.
Non-Final Office Action dated Dec. 19, 2007 in connection with U.S. Appl. No. 09/847,264, 11 pages.
Ex Parte Quayle Action dated Jan. 9, 2008 in connection with U.S. Appl. No. 10/776,086, 6 pages.
Notice of Allowance dated Feb. 22, 2008 in connection with U.S. Appl. No. 10/776,086, 4 pages.
Final Office Action dated Jun. 23, 2008 in connection with U.S. Appl. No. 09/847,264, 13 pages.
Non-Final Office Action dated Oct. 27, 2008 in connection with U.S. Appl. No. 11/672,151, 6 pages.
Advisory Action dated Jan. 16, 2009 in connection with U.S. Appl. No. 09/847,264, 2 pages.
Final Office Action dated Apr. 13, 2009 in connection with U.S. Appl. No. 11/672,151, 8 pages.
Advisory Action dated Jul. 16, 2009 in connection with U.S. Appl. No. 11/672,151, 5 pages.
Non-Final Office Action dated Oct. 2, 2009 in connection with U.S. Appl. No. 09/847,264, 12 pages.
Notice of Allowance dated Nov. 16, 2009 in connection with U.S. Appl. No. 11/672,151, 7 pages.
Notice of Allowance dated Mar. 15, 2010 in connection with U.S. Appl. No. 09/847,264, 4 pages.
Notice of Allowance dated Sep. 6, 2012 in connection with U.S. Appl. No. 12/708,062, 5 pages.
Non-Final Office Action dated Jan. 16, 2015 in connection with U.S. Appl. No. 13/495,823, 12 pages.
Non-Final Office Action dated Oct. 8, 2015 in connection with U.S. Appl. No. 13/495,823, 6 pages.
Non-Final Office Action dated Oct. 14, 2015 in connection with U.S. Appl. No. 14/287,794, 5 pages.
Notice of Allowance dated Jul. 25, 2016 in connection with U.S. Appl. No. 13/495,823, 5 pages.
Non-Final Office Action dated Jul. 17, 2017 in connection with U.S. Appl. No. 15/228,007, 8 pages.
Examinees Report dated Jan. 2, 2018 in connection with Canadian Patent Application No. 2,899,527, 3 pages.
Final Office Action dated Mar. 14, 2018 in connection with U.S. Appl. No. 15/228,007, 14 pages.
Examinees Report dated Apr. 13, 2018 in connection with Canadian Patent Application No. 2,899,527, 5 pages.
Notice of Allowance dated Jun. 27, 2018 in connection with U.S. Appl. No. 15/348,717, 9 pages.

* cited by examiner

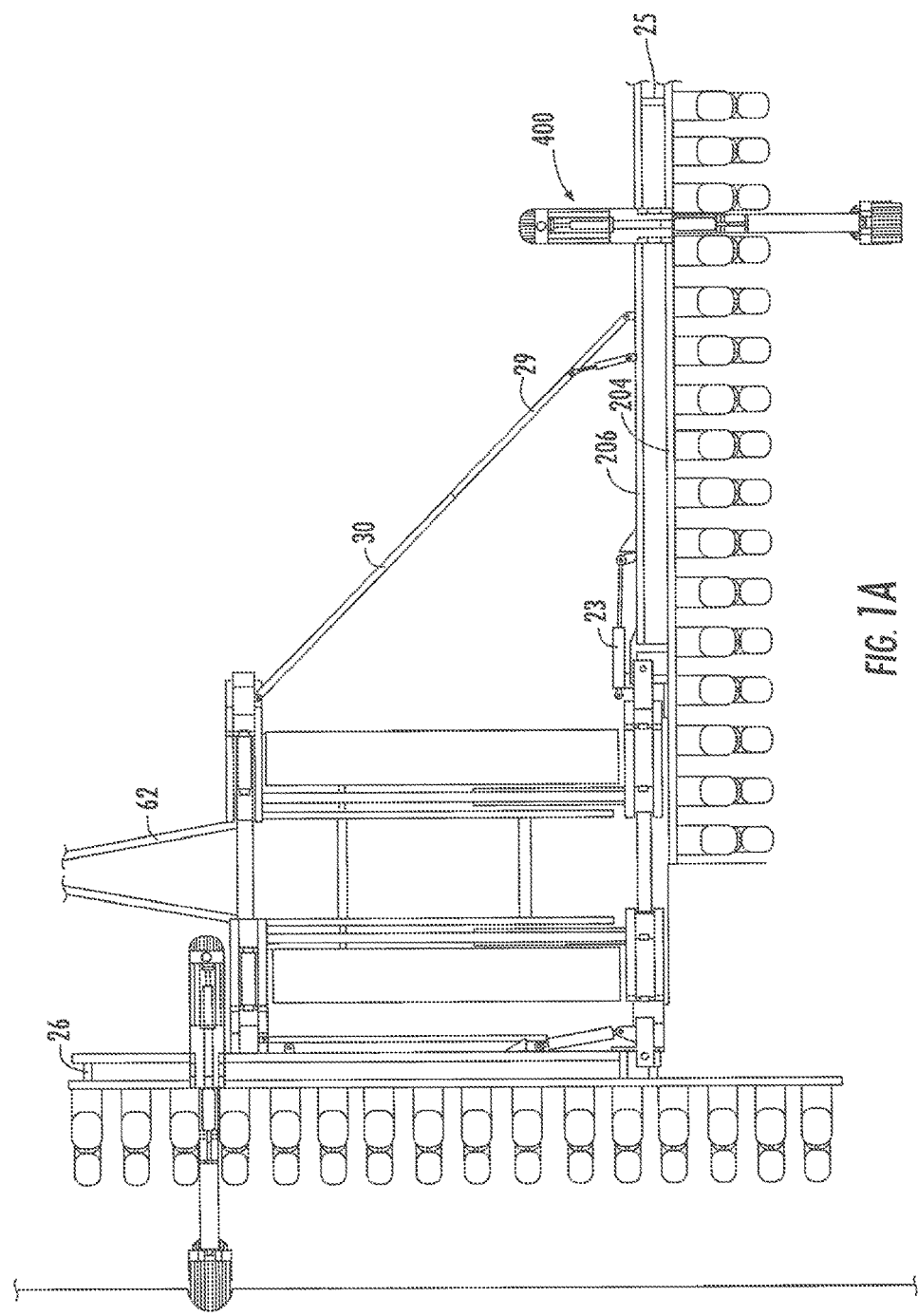

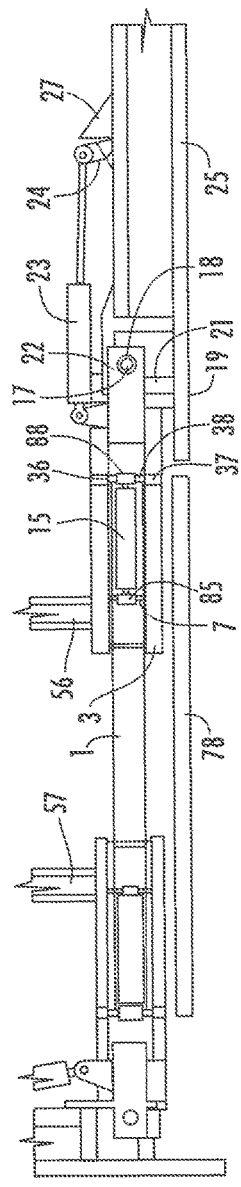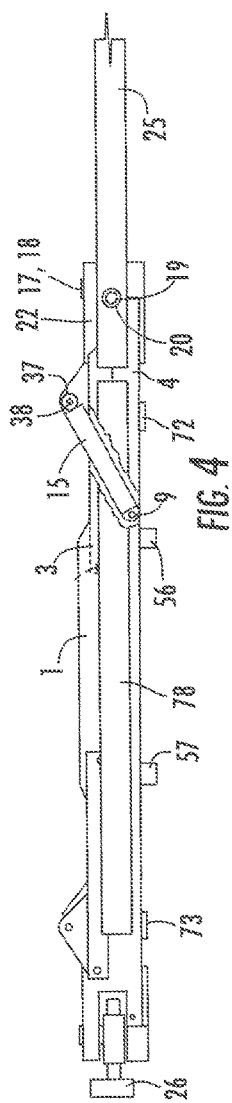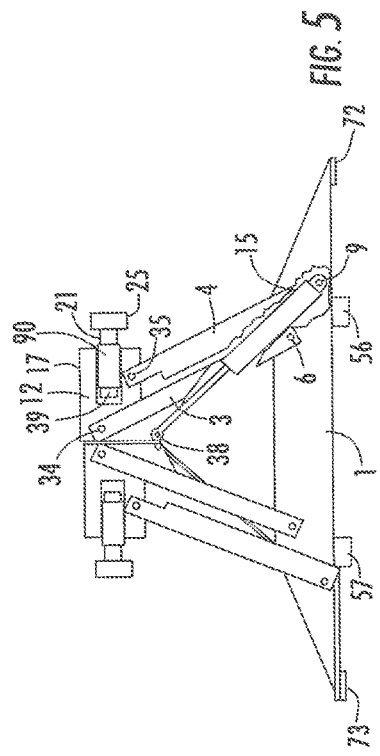

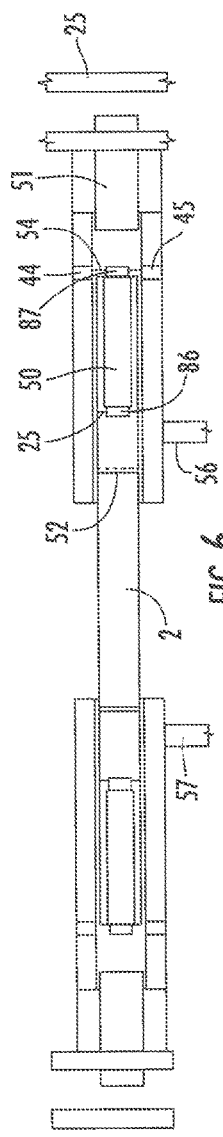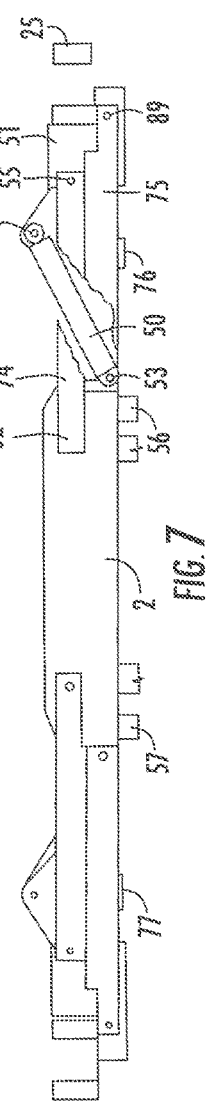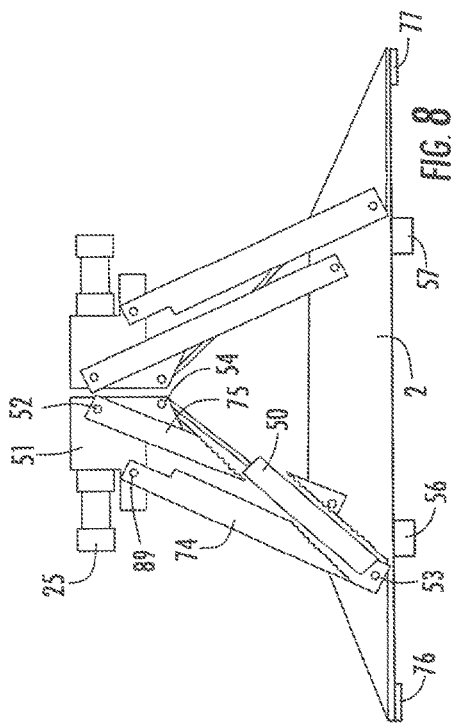

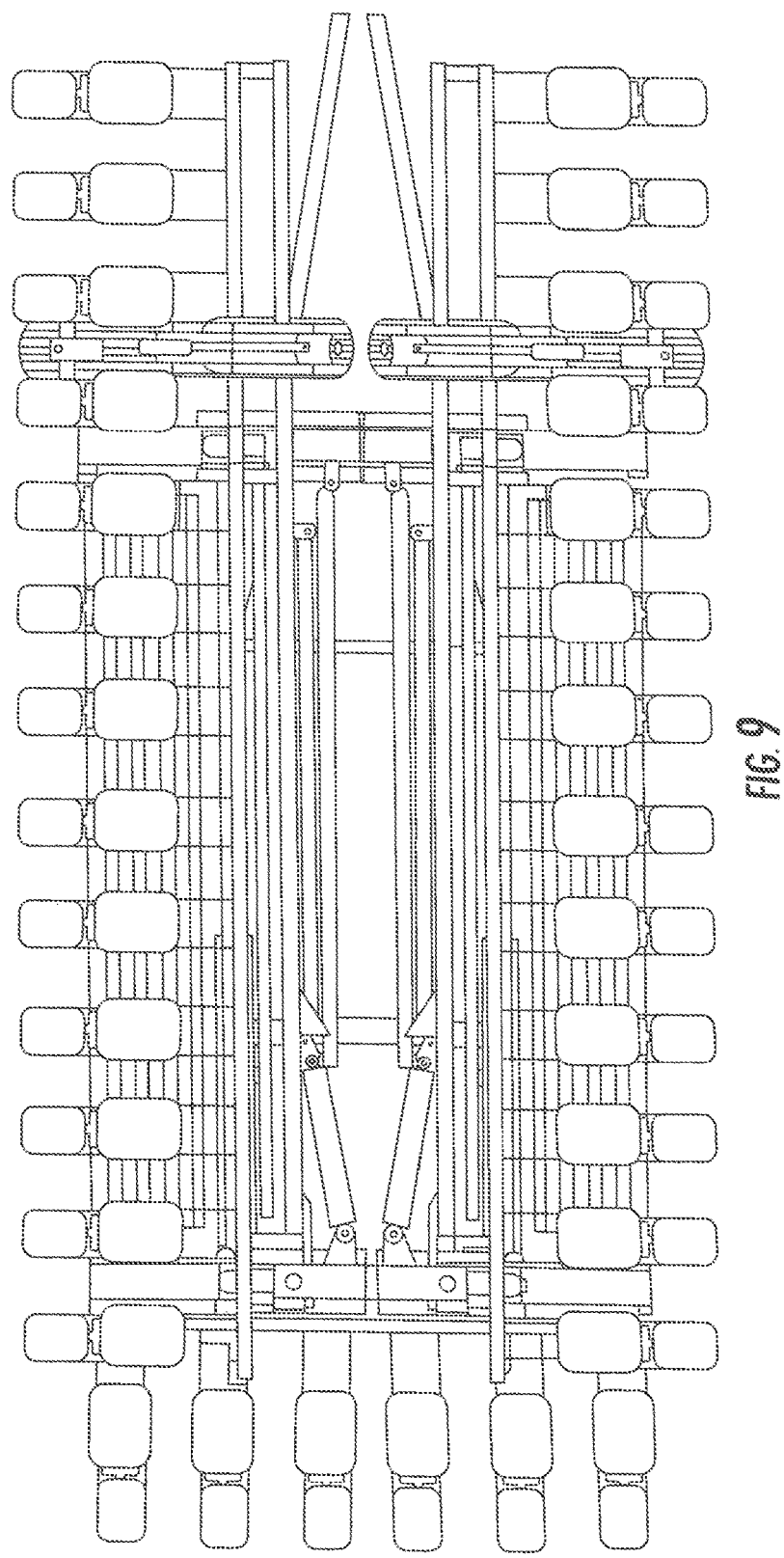

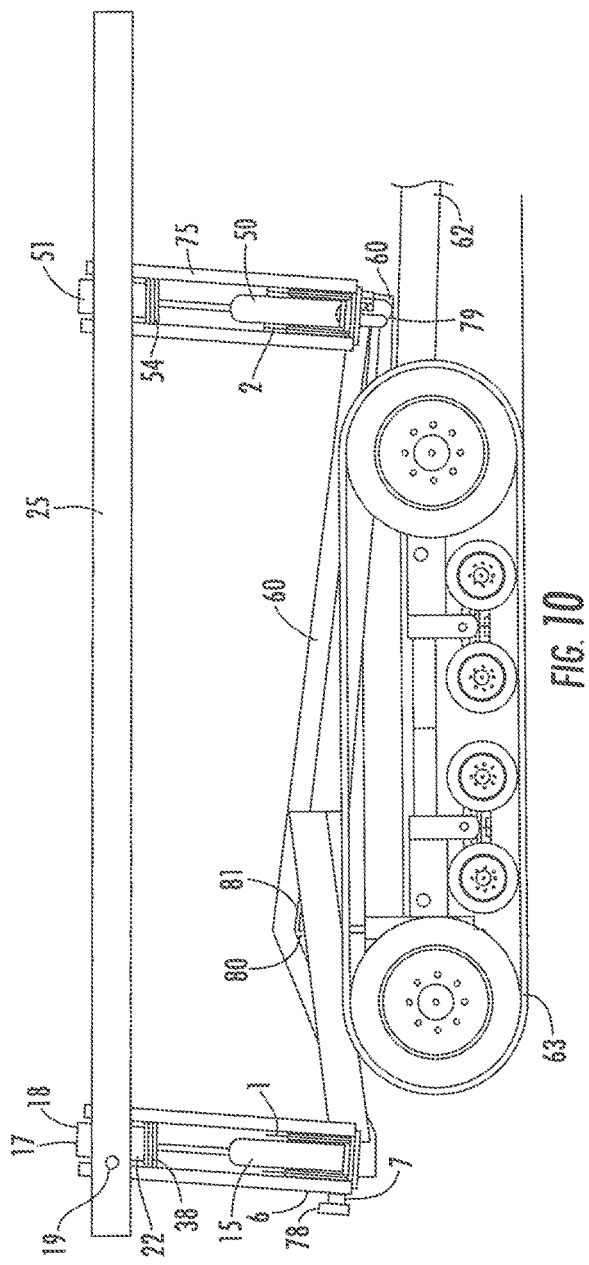
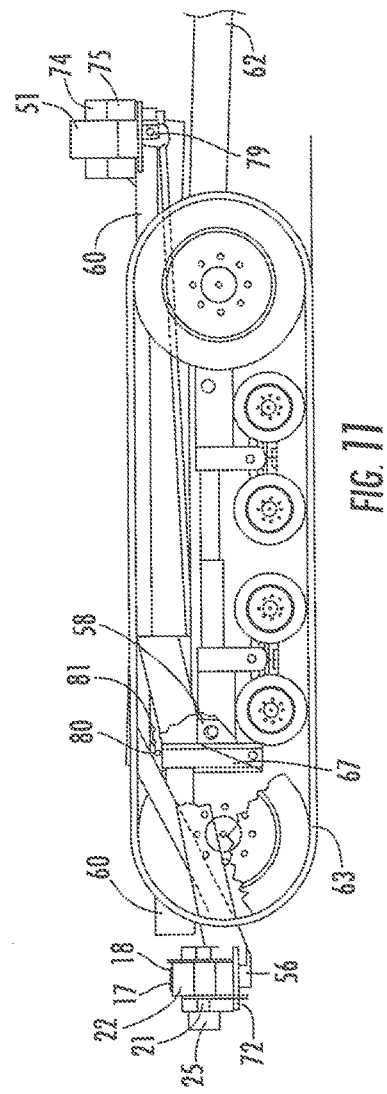

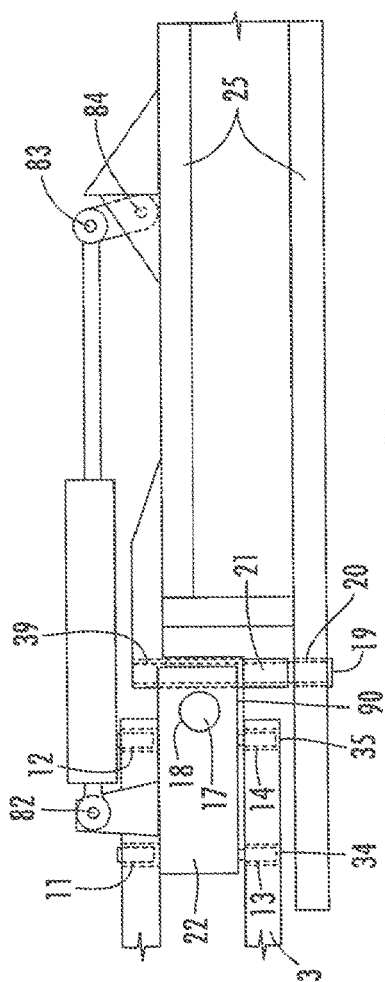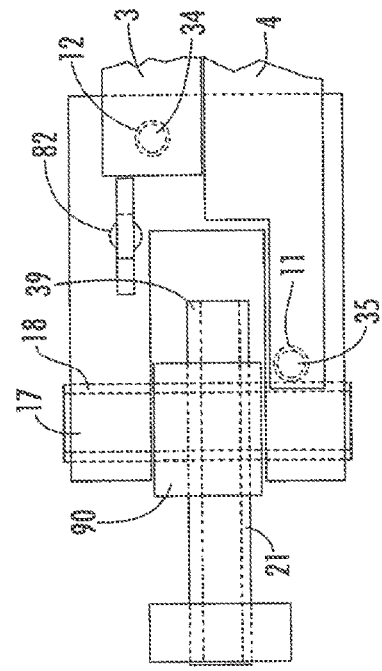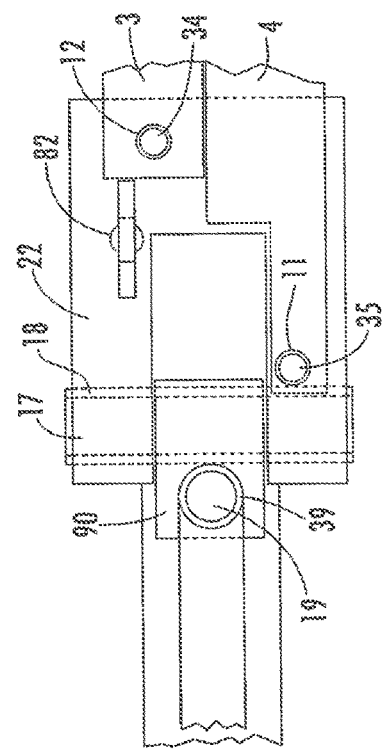

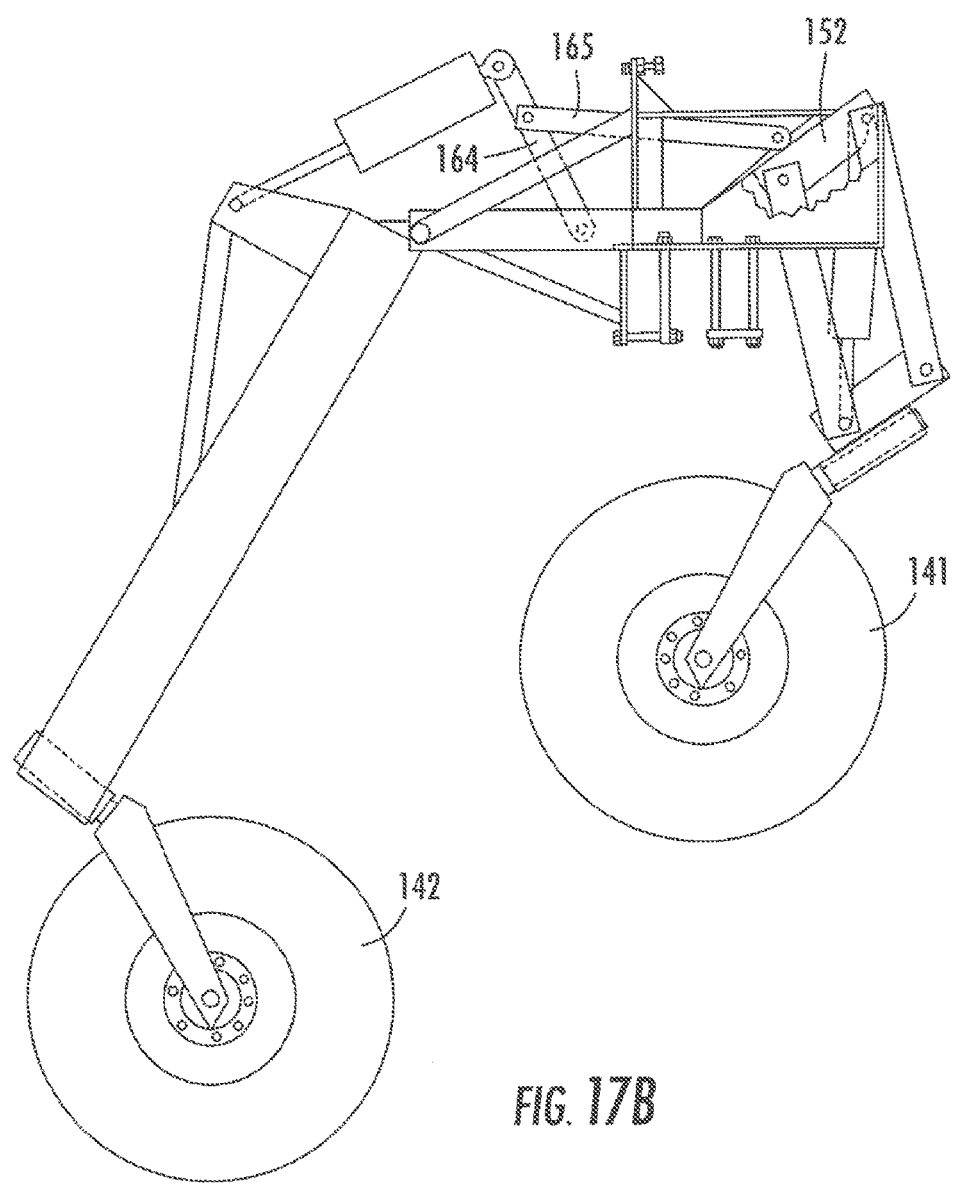

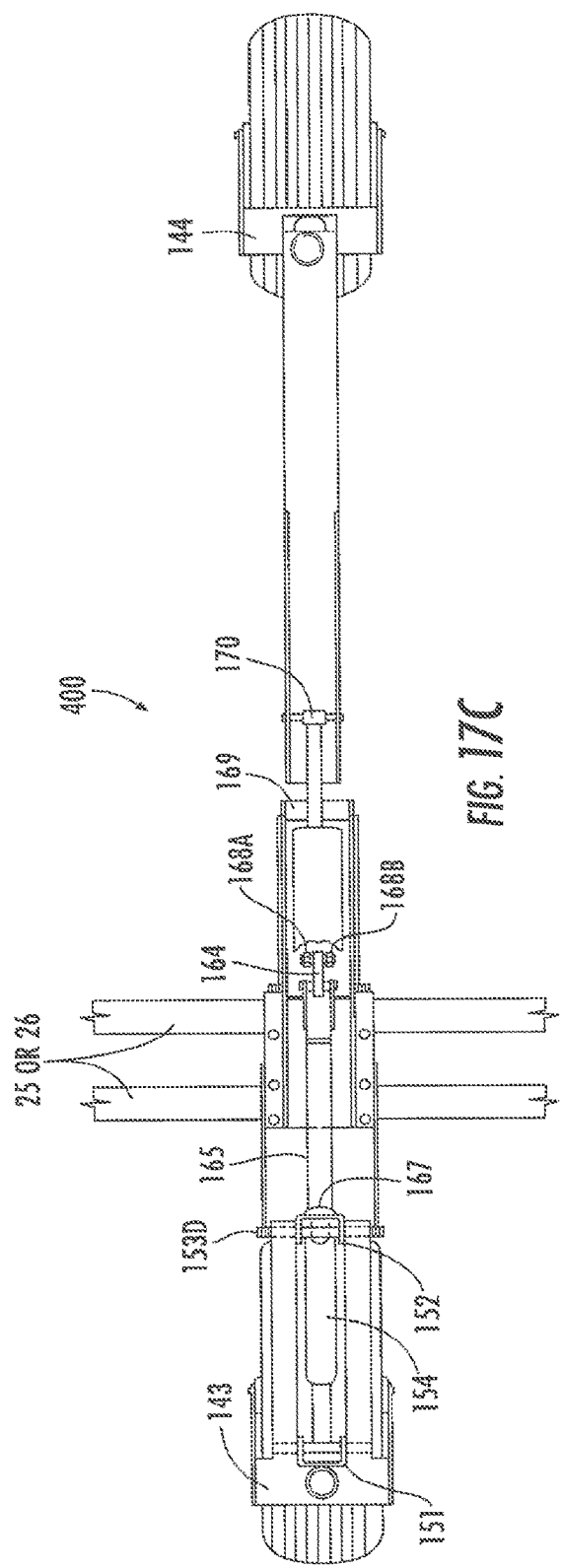

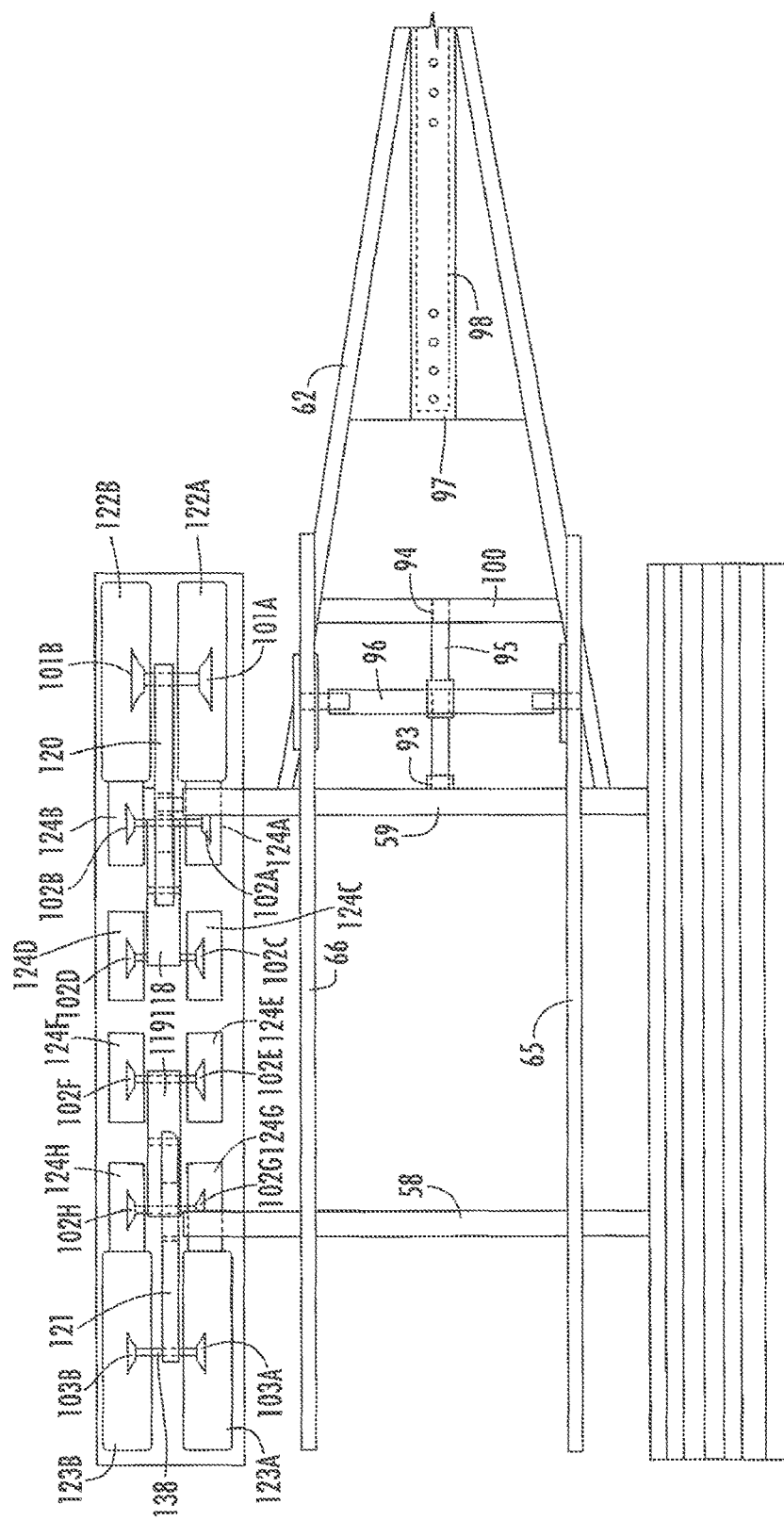

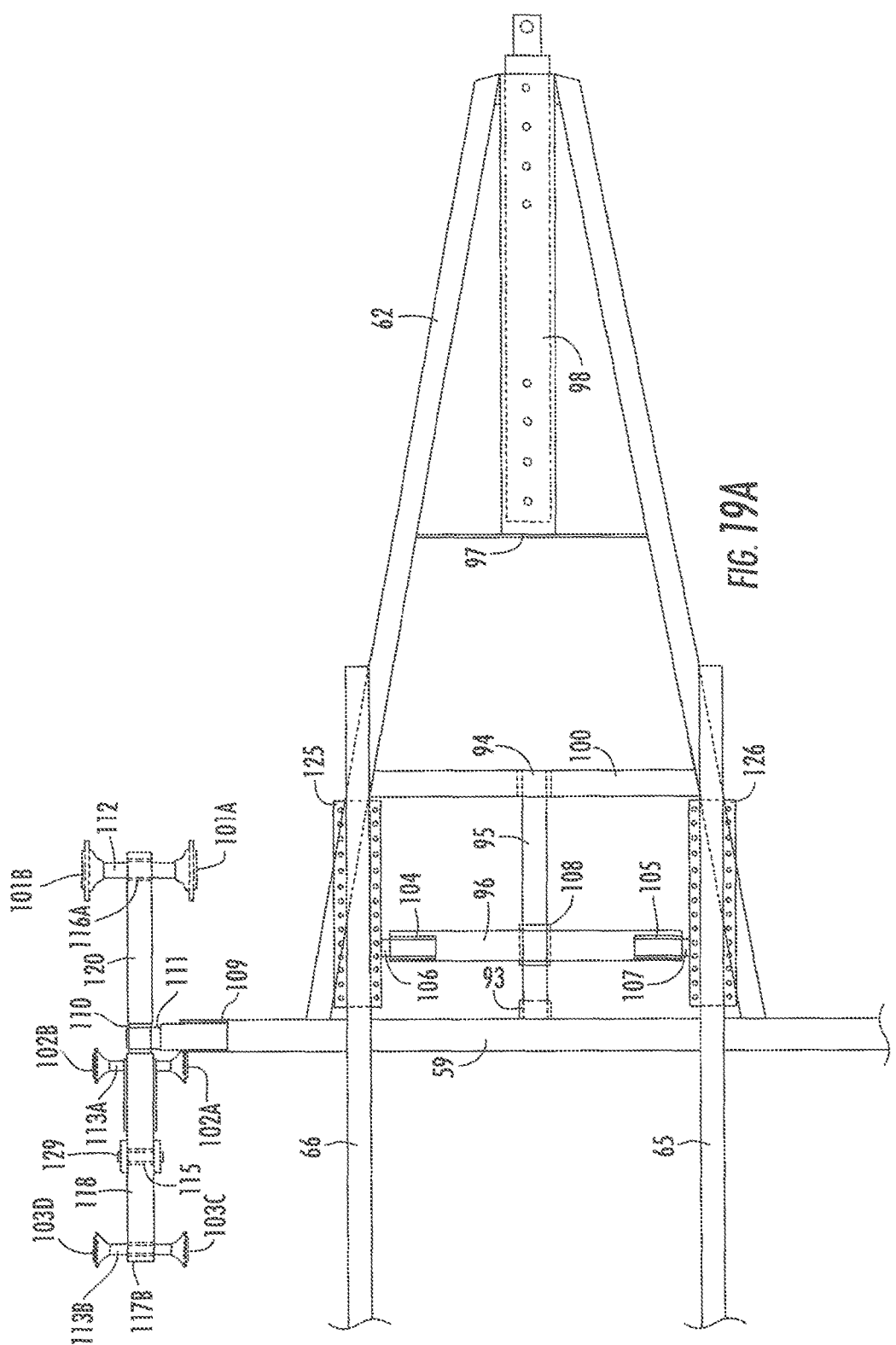

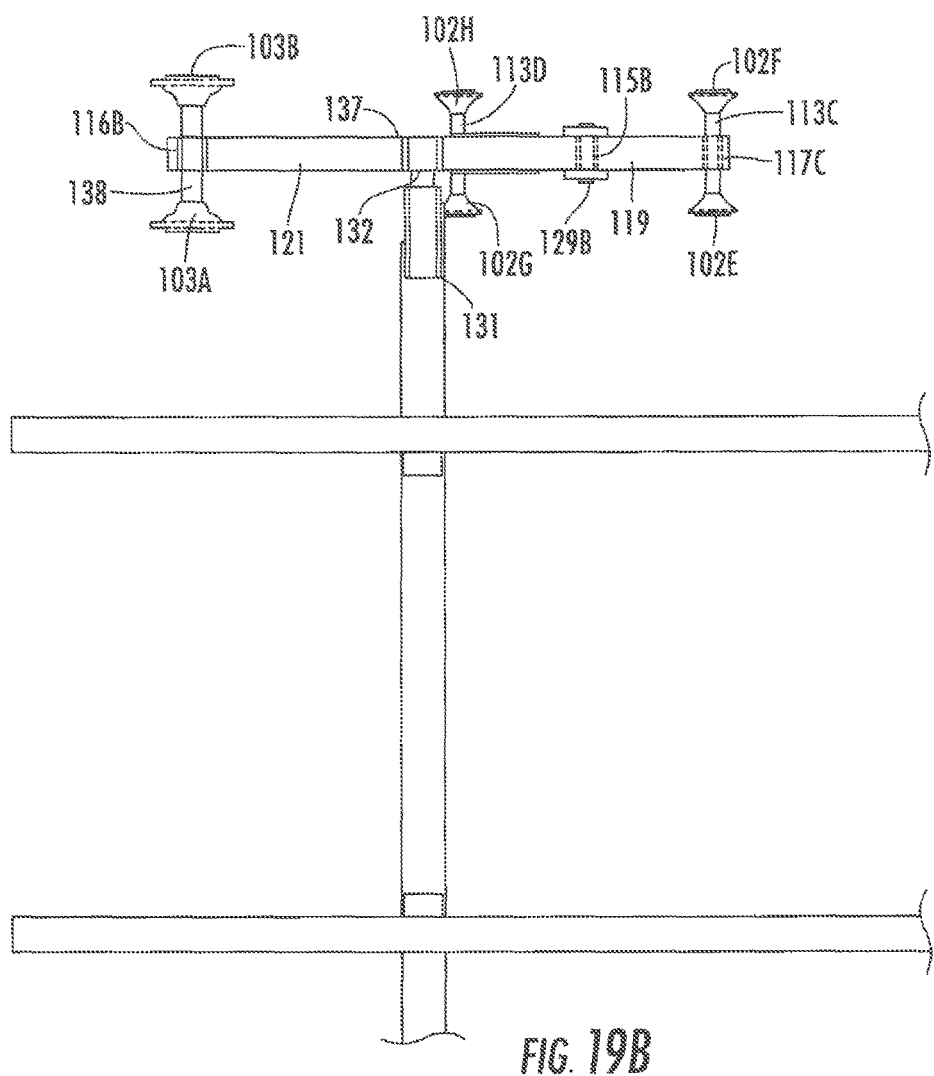

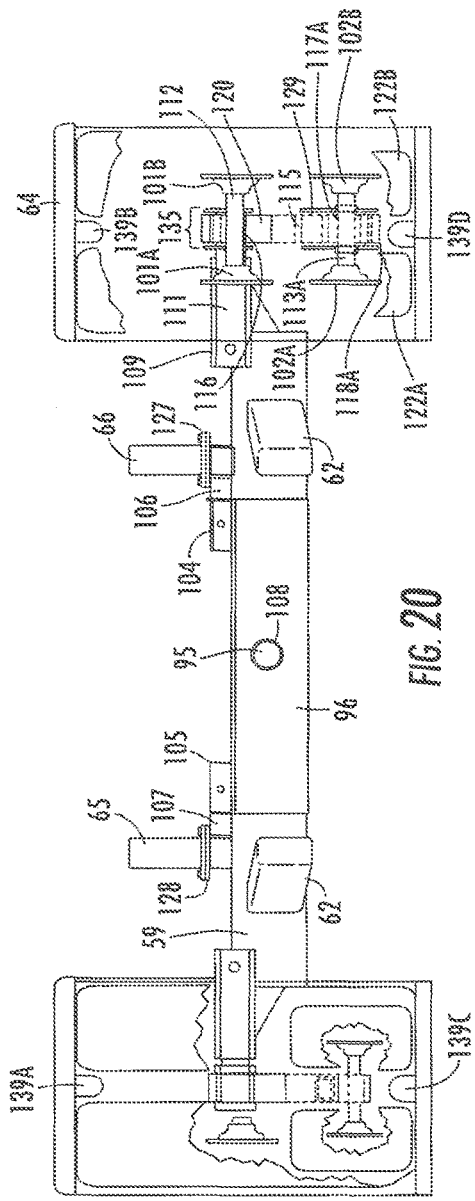
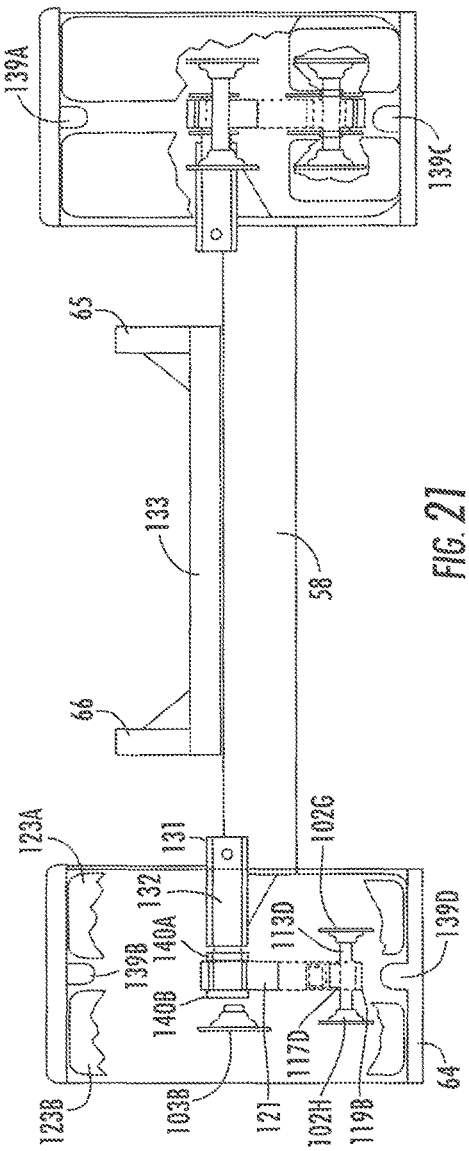

VEHICLE TRACK ASSEMBLY

CROSS-REFERENCE TO RELATED APPLICATIONS

This application is a continuation of U.S. patent application Ser. No. 14/287,794, filed on May 27, 2014, which is a continuation of U.S. patent application Ser. No. 13/707,515, filed on Dec. 6, 2012, now U.S. Pat. No. 8,763,716, which is a continuation of U.S. patent application Ser. No. 12/708,062, filed on Feb. 18, 2010, now U.S. Pat. No. 8,342,257, which is a continuation of U.S. patent application Ser. No. 09/847,264, filed on May 2, 2001, now U.S. Pat. No. 7,740,084, which claims priority from U.S. Provisional Patent Application Ser. No. 60/201,085, filed May 2, 2000. The disclosures of the prior applications are hereby incorporated in their entirety by reference.

BACKGROUND

This disclosure relates to an improved agriculture implement frame and cart. In particular, an improved foldable and stackable frame for supporting planters, sprayers, or similar devices is disclosed. A novel track design that is well-suited for transporting the foldable-stackable frame is also disclosed. A new and improved design for folding wheels that are used to support the free ends of the frame is also disclosed.

Foldable frames that are used to support agricultural tools, such as planters, sprayers, or similar tools are well-known and widely used. Typically, the frames are attached to the rear of a tractor, utility cart or similar transportation vehicle. The frames have long booms, or wings, that can be adjusted into an extended working position that is generally transverse to the direction of travel of the tractor. The extended wings are too wide to permit convenient transportation when moving from field to field, or from storage to the field. Therefore, typically, the wings will adjust into a transport position. In the past, this has generally been accomplished by either folding the wings forward along the sides of the transportation vehicle, or by stacking the wings at the rear of the transportation vehicle. Folding the wings forward along the side of the transportation vehicle still leaves the overall width wider than the transportation vehicle, because the tools are still located outside the wheelbase of the transportation vehicle. Stacking the wings may adversely affect the handling characteristics of the transportation vehicle. The present invention relates to a unique design that permits the wings to be folded forward, and then stacked, so as to make the overall width narrower than if the wings were simply folded forward. Also, the handling characteristics of the transportation vehicle are improved over what they would be if the wings were merely stacked. Furthermore, the arrangement of the wings in the transport position leaves an unusually large space in the center of the transportation vehicle for storage of such things as a fertilizer tank, extra seed, or similar items.

The wings may be mounted on a utility cart that can be pulled behind a tractor or other pulling device. These utility carts can take many different forms. Most commonly they have a frame on which the wings can be mounted, and wheels that engage the ground. It is also known to substitute tracks or belts for the wheels. One difficulty with these tracks or belts is that the front and rear of the tracks or belts tend to stay in angular alignment with each other in terms of both pitch and roll, which prevents the tracks from closely following the contours of the ground. The present invention utilizes idler wheels mounted on tandem arms to support the track. The idler wheels pivot independently from each other, and allow the track to twist and bend to match the contours of the ground.

The handling characteristics of the utility cart and tractor combination can be improved if the weight distribution between the cart and the tractor is adjustable. The utility cart of the present invention may include adjustable hitch plates that allow the weight distribution to be varied.

It is common to provide the booms or wings with support wheels near the outboard end of the wings to provide support for the wings when in use. This disclosure discusses a unique and improved design for folding these wheels into a transport position.

BRIEF DESCRIPTION OF THE DRAWINGS

FIG. 1 is a top view of a preferred embodiment of foldable wings mounted on a utility cart according to the present invention showing the right side wing folded out in working position, and the left side wing is folded in.

FIG. 1A is a top view of an alternative embodiment of the present invention that uses a two-section wing structure and includes foldable wheels on the outboard end of each wing.

FIG. 3 is a partial top view close-up of the embodiment shown in FIG. 2.

FIG. 4 is a partial rear view of the embodiment shown in FIG. 2.

FIG. 5 is a rear elevation showing a preferred embodiment of the rear stack assembly in the stacked position.

FIG. 6 is a partial top view close-up of the front portion of the embodiment shown in FIG. 2, with both wings in the folded position.

FIG. 7 is a front elevation of front stacking assembly shown in FIG. 6.

FIG. 8 is a front elevation showing front stack assembly of FIG. 7 in the stacked position.

FIG. 9 is a top view of the embodiment of FIG. 1A in a transport position.

FIG. 10 is a side elevation of the frame and cart in the stacked transport position.

FIG. 11 is a side elevation of the frame and cart in the stacked transport position.

FIG. 14 is a partial top view of the right wing pivot and support assembly of the preferred embodiment of FIG. 1.

FIG. 15 is a partial rear view of the wing pivot and support assembly of FIG. 14.

FIG. 16 is a partial rear view of the wing pivot and support assembly of FIG. 14 in a folded position.

FIG. 17B is a side elevation of the wing wheel assembly of FIG. 17A in tucked transport position.

FIG. 17C is a side elevation of the wing wheel assembly of FIG. 17A in tucked transport position.

FIG. 18 is a partial cut-away top view of preferred embodiment of utility cart showing left side track assembly.

FIG. 19A is a partial top view showing left front cart and hitch.

FIG. 19B is a partial top view close-up showing details of FIG. 19A.

FIG. 20 is a front elevation of an embodiment of a utility cart.

FIG. 21 is a rear elevation of an embodiment of a utility cart.

DETAILED DESCRIPTION

Shown generally in the figures is an improved utility cart 200 for use in association with an improved folding and stacking agricultural implement frame 300. The utility cart is suitable for being pulled behind a tractor or other similar pulling vehicle. With respect to the figures, right and left designations refer to viewing the cart 200 and implement frame 300 from the rear looking in the direction of travel. The right and left side of this design are mirrored images of each other; therefore, the description will concentrate primarily on the right side.

Figure 1:
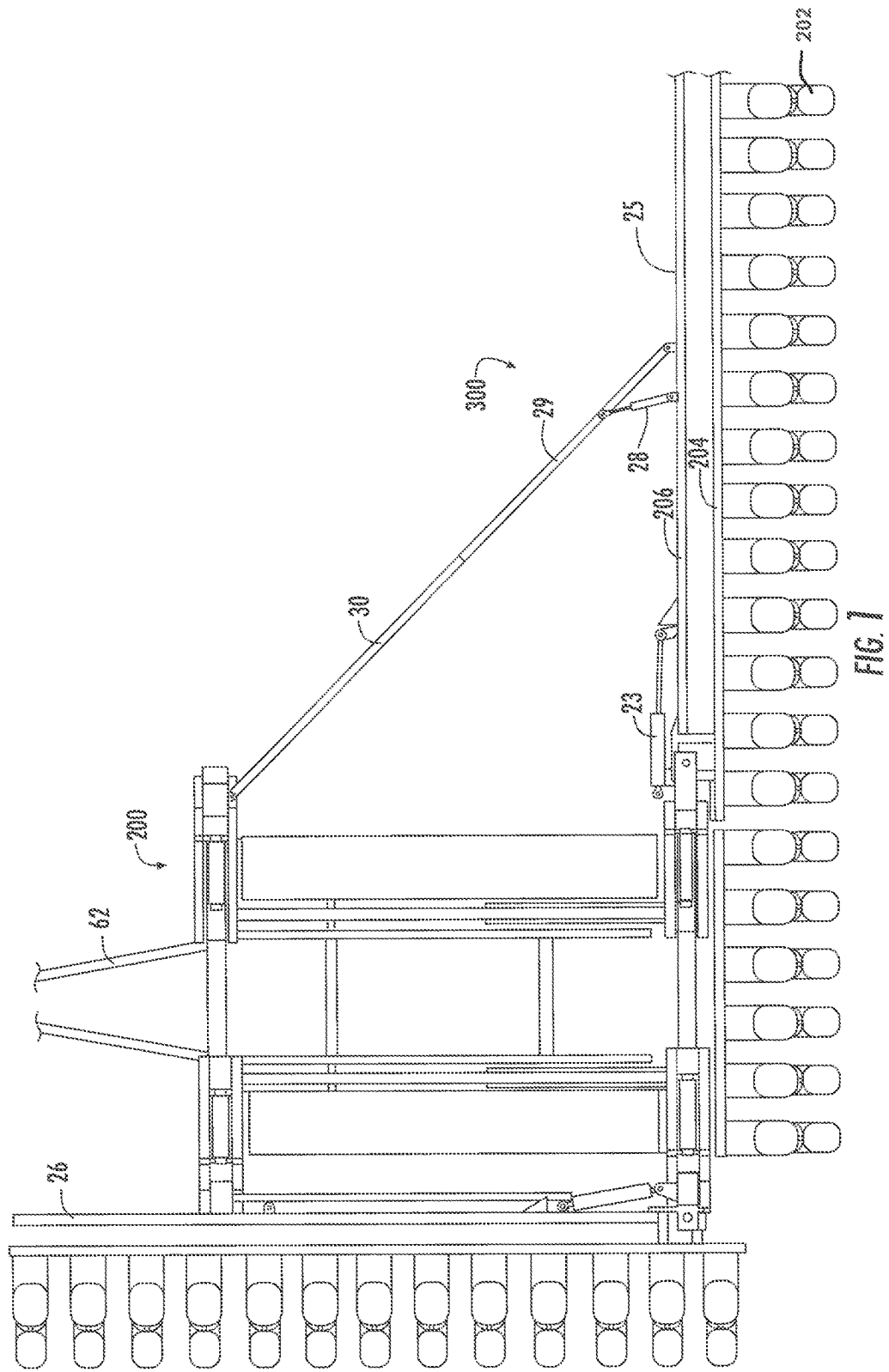

The implement frame 300 is the type that has wings 25,26 that fold outward to extend transversely to the direction of travel of the tractor so that several rows of crops can be worked on with a single pass. FIG. 1 shows a top view of the cart 200 and implement frame 300 combination with a right wing 25 in working position and the left wing 26 still in folded position. Implement frame 300 can have various implements attached for numerous uses such as fertilizer spraying, pesticide spraying, planting, and other uses. For these illustrations, planter units 202 are shown. The wings 25, 26 can be varied in length to accommodate different row spacings and number of rows.

Figure 2:
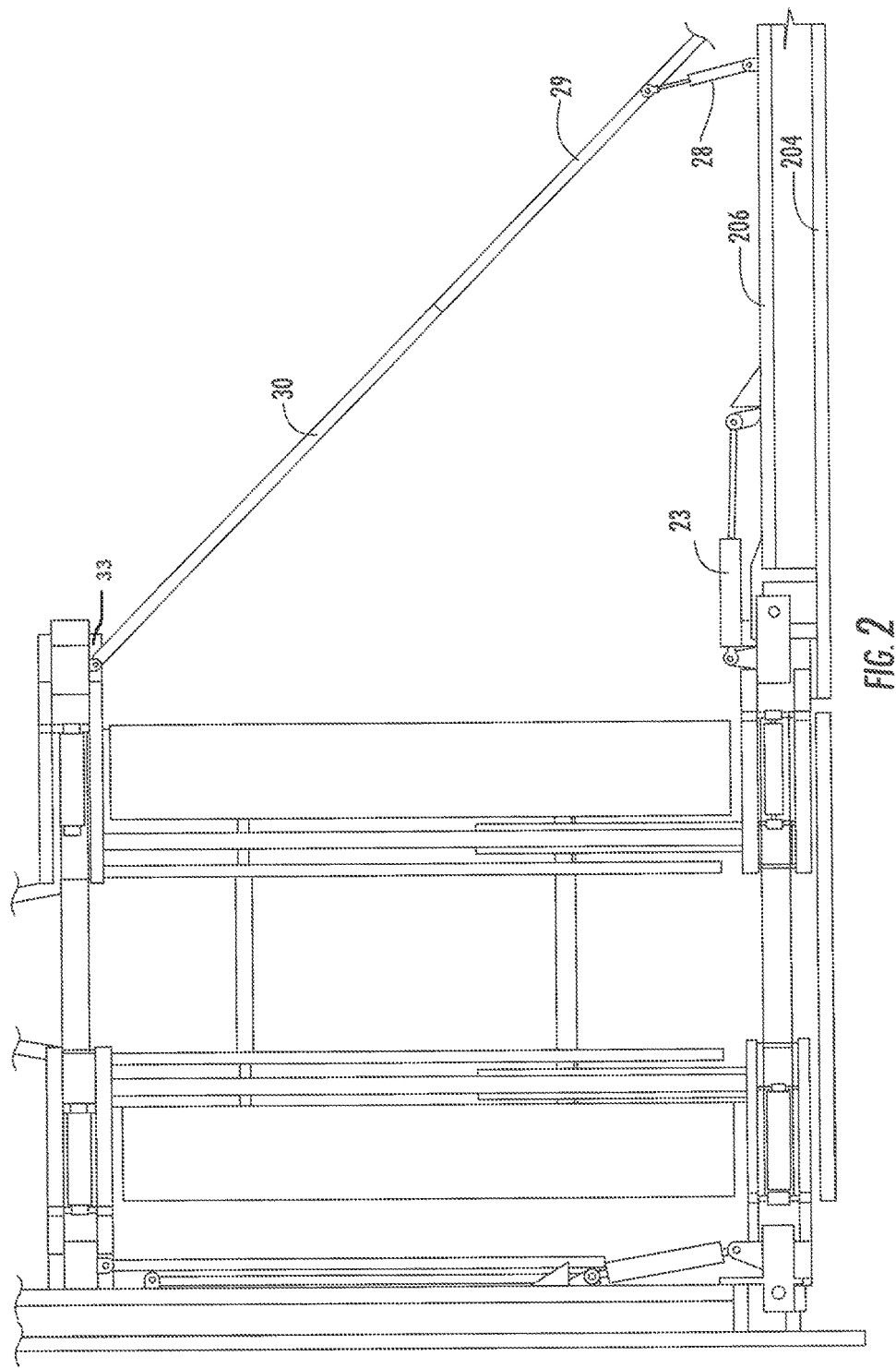
FIG. 2 is a partial top view of the rear portion of the embodiment shown in FIG. 1, with the implements removed from the wings.

As best seen in FIG. 2, the wings 25, 26 comprise a wing tool bar 204 and a wing support bar 206. The planter units 202, or other implements, attach to the wing tool bar 204. According the embodiment shown in FIG. 2, a rear tool bar 78 is attached to the rear of the cart 200 to permit attachment of implements. When in full working position, both wings 25, 26 are folded out or back perpendicular to the main lift arms 56, 57 and in line or parallel to plane of the rear tool bar 78. Alternatively, the rear tool bar 78 may be eliminated, and the left and right wings 25, 26 can be extended inboard. (FIG. 1A). In planting position, wing lock arms 29, 30 are unfolded and held in a straight or slightly overcentered position by the wing lock arm hydraulic cylinder 28. Front wing lock arm 30 is attached to a ball swivel in a plate 33 extending from front wing hold assembly 51. Ball swivel and plate 33 are almost directly in a direct line with the pin 19 in the wing pivot assembly 90. This allows the entire wing 25 to go up and down following the terrain without binding.

Figure 13:
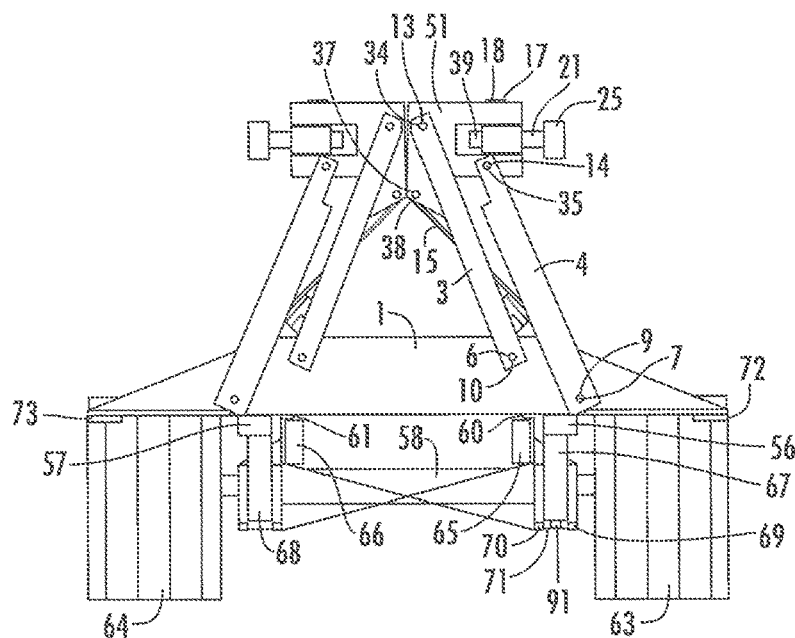
FIG. 13 is a rear view of the preferred embodiment of FIG. 12 in a stacked transport position.

The raised/lowered position is controlled by two hydraulic cylinders 67, 68 which extend and raise main lift arms 56, 57. (FIG. 13). The right 67 and left 68 main lift cylinders are attached to main frame rails 60, 61 by plates of steel 69, 70 on each side of the cylinder with pin 71 placed in holes in plates 69, 70 and through round sleeve on butt of cylinder forming a pivot. Ram of cylinders 67, 68 attach to a pivot plate 81, FIGS. 10 & 11, which is optional and could be attached directly to main lift arms 56, 57. But pivot plate 81 acts as a manual extra flex in uneven terrain. Raising and lowering can be accomplished by placing a lift wheel behind rear main support frame 1 and/or rear tool bar 78 in many different configurations.

Figure 17A:
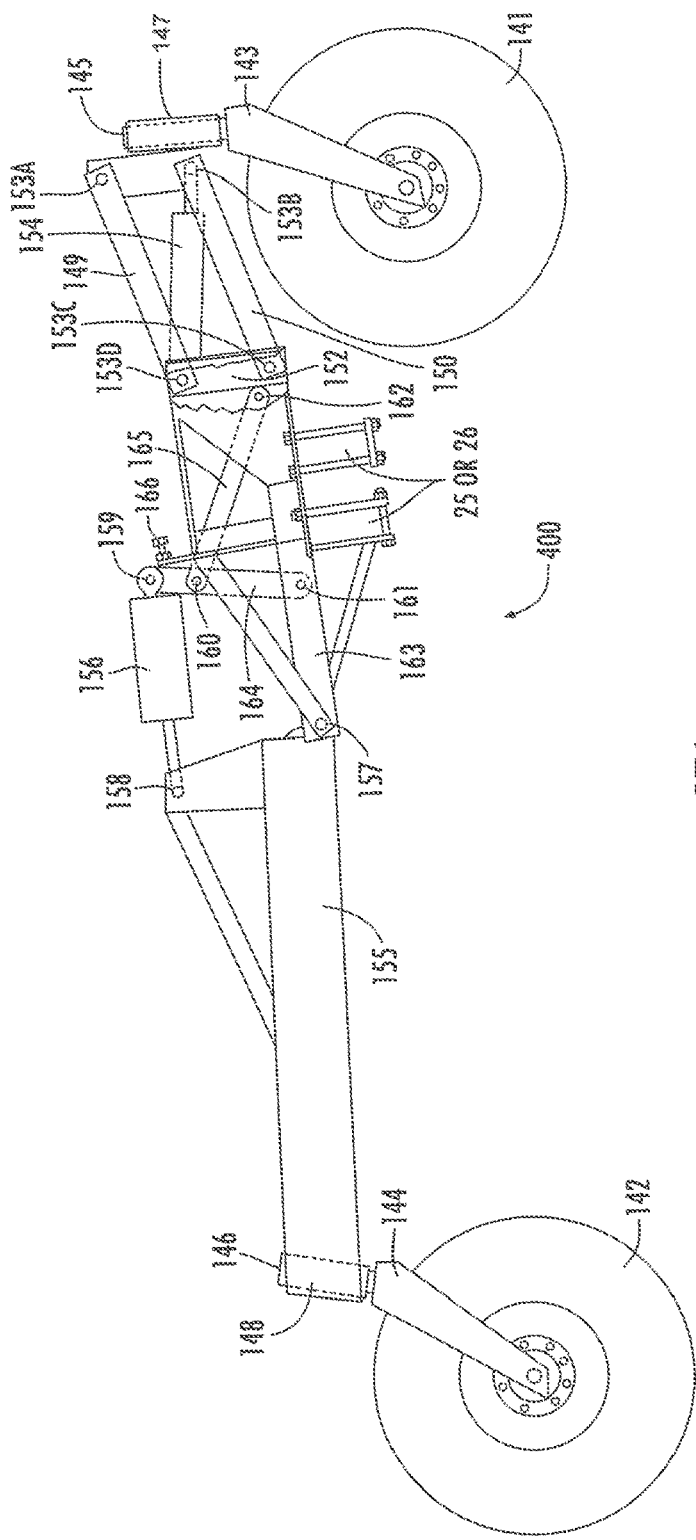
FIG. 17A is a side elevation of a preferred embodiment of the wing wheel assembly in lowered position.

Wheel lift assemblies 400 (shown in FIG. 1A and further detailed in FIG. 17) are placed on the outboard end of wings 25, 26. Placing of assembly or type of assembly can vary. The wheel assembly (FIG. 17) preferably raises and lowers simultaneously with main frame. These wheel lift assemblies are described in greater detail below.

To get to transport position, wings 25, 26 are folded in. The left side is shown in folded position in FIG. 2. Hydraulic wing fold cylinder 23 (FIG. 14), is retracted, wing 25 is pivoted on pin 17 of wing pivot assembly 90. Pin 17 also extends through wing pivot support assembly 22 to form a pivot. Part of wing pivot assembly 90 is wing flex sleeve 21 (FIGS. 14 and 16). Pin 19 extends through sleeve 20 and through wing flex sleeve 21 and through round sleeve 39 in wing 25 (FIG. 15). This allows wing to pivot up and down to follow contours of land or whatever application requires. Before hydraulic wing fold cylinder 23 can retract, the wing lock arm hydraulic cylinder 28 has to retract and begin folding the lock arms 29, 30 inboard. A hinge allows lock arm 29, 30 to pivot in a horizontal plane with wing 25 (FIG. 2).

The wing fold cylinder 23 attaches to a plate extending out from wing pivot assembly 90 (FIG. 14). The cleaves end of the butt of the cylinder attaches to a welded ball swivel 82 in the plate. This allows for the wing to flex up and down. The ram end of the cylinder attaches to a ball swivel in flex arm 24 which pivots on a pin 84 which is between two plates of steel with holes forming hinge. This also allows for wing flex without the cylinder extending or retracting during field operations, which is optional in the design.

Figure 12:
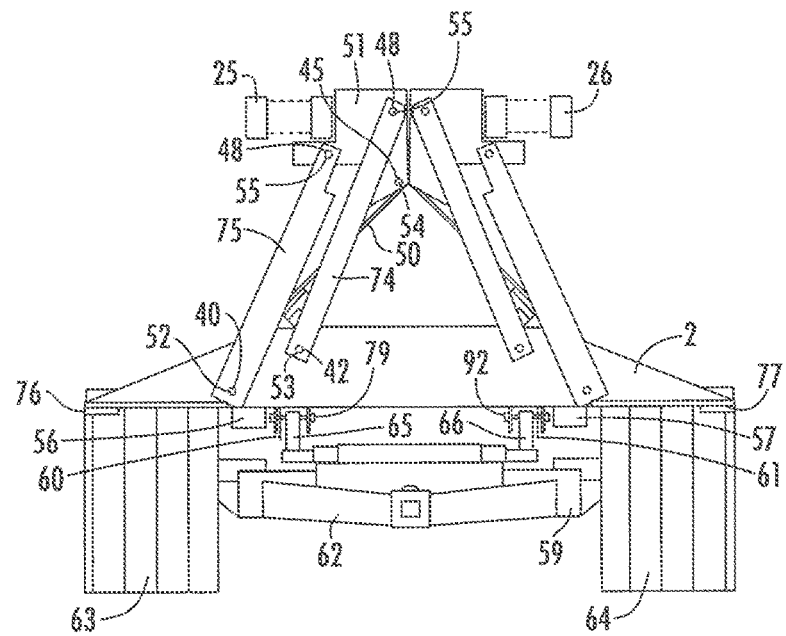
FIG. 12 is a front view of the preferred embodiment of FIG. 1 in a stacked transport position.

When cylinder 23 is fully retracted, the wing frame 25 is over and up to notch in front wing hold assembly 51. This can have many different designs to hold wings to the assembly 51 but had to be able to lift the wing 25 in an arcing vertical movement. (FIGS. 6, 7 and 12).

When wing 25 is on the front wing hold assembly 51 the wing lock arms 29, 30 are fully inverted by the wing lock hydraulic cylinder 28 so they are parallel or close to parallel to the wing 25. Then the stacking hydraulic cylinders 15, 50 can be extended simultaneously using rephasing cylinders or master slave cylinder. The butt end of cylinder has a sleeve or cleaves so it may pivot as cylinder is actuated. It is held by a pin 9, 53 which passes through a sleeve or holes in the inboard ends of the rear and front bottom stacking arm 4, 75 and also through holes or bushings in the steel plates that form rear and front main support frames 1, 2. The cylinder ram pivot 87, 88 is at the end of the ram of the stacking cylinders 15, 50. It can be a sleeve or cleaves which is held by a pin 38, 54 which passes through welded sleeves 36, 37 and 44, 45 which are attached by metal plates welded to the top of the stacking arm 3, 74 shown best in FIGS. 3, 4, 6 and 7.

The top stack arms 3, 74 are attached by pin 10, 52 which extends through sleeve or holes in the stack arms 3, 74 and through a hole or bushing in the upright plates of steel that form the main support frame 1, 2.

The outboard ends of both the top and bottom stack arms, front 74, 75 and rear 3,4 have round sleeves and 11, 13 and 12, 14 or holes which pins 34, 35, 55, and 89 extend through. In the front, stack arms 74, 75 pin 55, 89 also extend through holes or bushings in the front wing hold assembly 51 FIGS. 6 & 7. The rear stack arms 3, 4 are similar to the front. Pin 34, 35 extends through hole or bushings in the wing support pivot assembly 22.

Both front and rear, top and bottom stack arms 3, 4 and 74, 75 are similar in length and hole or bushings in main support frames 1, 2 and front wing hold assembly 51 and wing pivot support assembly 22 are matched in these illustrations which keep the wing frame 25 perpendicular to the main frame through the entire vertical arc of the stacking movement. By varying the length between the pivot points, frame, top stack and bottom stacking arms, the angle of the wing frame could be pitched up or down through the vertical arc of the stacking arm and would accomplish the same basic principle.

When the stack cylinders 15, 50 are extending close to the top of the arc, they continue to pass top of center and over center (FIGS. 5, 8 and 9). Gravity helps to keep the wings 25, 26 in the transport position even though there is still pressure via trapped oil within the stack cylinder which will also hold wings 25, 26 in transport position (FIG. 10).

Going over center is not totally necessary and in some uses other frames may not be designed this way, which would increase the distance between the wings 25, 26 in transport position or to narrow main support frame so that total transport width may be narrower.

Unstacking the wings 25, 26 is performed by applying pressure to the hydraulic oil on the ram side of the stack cylinder 15, 50 so that they retract simultaneously until they are totally retracted and the stack arms 74, 75 and 3, 4 are horizontal (FIGS. 4 & 7). The bottom stack arms 75, 4 rest on the retracted stack cylinder 15, 51 and also steel plate 72, 73 that extend out from the bottom of the main support frame 1, 2 (FIGS. 12, 13). Also, the tube that connects both sides of stack arms may be welded in a manner that they rest on the vertical plates that form main support frame 1, 2, but in an area where they do not conflict with the stack cylinders 15, 51 in any of their range of arc.

The front wing hold assembly 51 must be slightly lower than the height of the wing frame 25 at the point where they connect (FIG. 7). Now pressure can be applied to the hydraulic oil on the ram side of the wing fold cylinder 23 which extends it out and pushes the flex arm 24 against the unfolding stop 27 which is made by welding steel plates to the wing frame 25. As the wing fold cylinder 23 continues to extend, the wing 25 pivots on pin 17 in the welded sleeves 18 of the wing pivot assembly 90 (FIG. 15). The wing pivot assembly 90 is also connected by pin 17 to the wing pivot support assembly 22. The wing lock cylinder 28 is also extending at the same time as wing fold cylinder 23. When the wing 25 is in the working position (FIG. 2) shown perpendicular to main lift arm 56 the wing lock cylinder 28 is fully extended and front lock arm 30 and rear lock arm 29 at center lock arm hinge 32 are straight or slightly past center. The unfolding of the wings 25, 26 should be performed with the planting units off the ground so not to create more resistance.

The main frame has many parts. The base frame 60, 61 rest on the frame rails 65, 66 of the utility cart. As an alternative, these frame rails 65, 66 may be mounted so that their tops are angled slightly inwardly. The base frame members 60, 61 must be correspondingly angled in this instance, as shown in FIGS. 20 and 21. Angling the frame rails inward facilitates mounting the base frame 60, 61 because it will help align the frame rails with the base frame 60, 61 if they are slightly off alignment. The leading edges of the frame rails 65, 66 may be similar angled in order to help base frame 60, 61 align both side-to-side and front-to-rear. When using a removable cart assembly (these drawings use a tracked cart for the carriage) the base frame 60, 61 and frame rails 65, 66 could be combined for the purpose of a permanent carriage.

The base frame 60, 61 is attached to the front main support frame 2 by pins 79, 92 which extend through plates of steel welded to the bottom of the main support frame. Pins 79, 92 extend through holes in plates of steel and then through a hole or sleeve in the base frame 60, 61. This forms a pivot or hinge. (FIGS. 11, 12).

The front main support frame 2 is attached to the main lift arms 56, 57 near the front of frame. These positions can be varied to meet different lengths of wings or different carriage lengths or many other needs.

The rear main support frame 1 is mounted at the rear main lift arms 56, 57 (FIGS. 10, 11). The main support frames 1, 2 must be parallel. Further, their vertical planes must be parallel [though not necessarily perpendicular to main lift arms 56, 57 or base frame 60, 61] so that front 74, 75 and rear 3,4 stacking arms in their arcing movement remain parallel.

The main lift arms 56, 57 and base frame 60, 61 can be designed in many different ways and the design shown in FIG. 11 is not the only pertinent design. The main lift arm 56, 57 must be strong enough to carry all the weight of the wing frames 25, 26 and attachments to the wings.

Behind the rear main support frame, this design uses an implement tube 78 for mounting units.

The base frame 60 rests on the cart frame 65 and is attached as previously described. Extending down parallel from base frame rail 60 is a plate of steel which extends down to the sleeve 91 (FIG. 13) on the butt end of the main lift cylinder 67. Welded to this plate is another plate which is perpendicular to the first. Welded to this plate is another plate perpendicular to the last that forms a "U" shape. This assembly forms a support for the main lift cylinder 67. Pin 71 extends through holes or bushings 69, 70 in the steel plates and through the sleeve 91 on the butt end of the main lift cylinder 67. Pin 71 is at a 90 degree angle to the base frame allowing the main lift cylinder to pivot parallel to the base frame 60. On the extended plate that is 90 degrees from the base frame rail, a horizontal plate should be welded in a manner that it rest and gain support from the rear main carriage axle 58. Also sleeve 91 should be slightly oversized to allow for some side to side sway. The above described supporting of the main lift arm cylinders 67, 68 can be accomplished by other methods.

The wing wheel lift assembly illustrated in FIGS. 17A-D is unique and is well suited for this tool bar design but is not the only acceptable method of raising and lowering the wing frame 25, 26.

The wing wheel lift assemblies for wings 25, 26 are identical, so only one will be described here. The leading wheel 141 and the trailing wheel 142 both caster or swivel 3 60 degrees in either direction. The leading and trailing wheels 141, 142 are illustrated using a standard fork type mounting 143, 144. A single offset arm and spindle caster could be used. The leading wheel 141 and fork 143 swivels on a vertical shaft 145 that extends through a round sleeve 147 which is attached to an outboard bracket 151. The outboard and inboard brackets 151, 152 are mirror images and both are somewhat "U" shaped. This allows the leading wheel hydraulic cylinder 154 space for its movement. These brackets 151, 152 are connected to upper and lower parallel link arms 149, 150 by pins 153A-D which extend through holes or round sleeves in the ends of the parallel link arms 149, 150 and through holes in the outboard and inboard brackets 151, 152. In these illustrations, the butt end of the leading wheel hydraulic cylinder 154 pivots on pin 153D and the ram end pivots on pin 153B. The end of the cylinder could be attached and pivot on separate pins and still conform to this design. This type design uses parallel link arms to keep the caster wheel at a constant vertical angle which is not unique. What is unique is that the inboard bracket 152 also pivots or swings in and out perpendicular to the frame on pin 153D. (This pivot could be placed in a different pin or sleeve but still conform to this design.) (FIGS. 17 A & B).

Figure 17D:
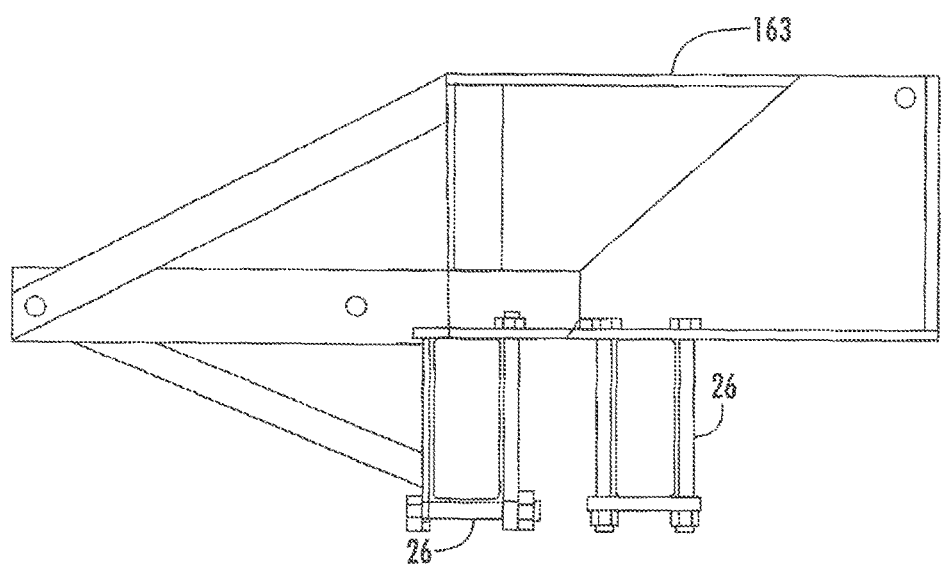
FIG. 17D is a side elevation of a preferred embodiment of a wing wheel lift bracket.

Pin 153D extends through holes in plates of steel which are vertical and are outside of upper and lower parallel link arms 149, 150 and are spaced far enough apart and in front of wing frame 25, 26 that it can pivot or swing inward in an arcing movement perpendicular to the wing frame 25, 26. These plates of steel are part of the wing wheel lift bracket 163 (FIG. 17D).

The bottom of the inboard bracket 152 is attached by pin 162 to bracket 167 which is attached to the back or inboard side of inboard bracket 152 by pin 162 which extends through a hole in wheel tucking link arm 165 forming a pivot. The other end of the wheel tucking link arm 165 is attached to the wheel tucking lever 164 by pin 160 which extends through holes in both 164,165 which also forms a pivot. (FIG. 17C).

The wheel tucking lever 164 is attached to the wing wheel lift bracket 163 by pin 161 which extends through brackets 168A&B that are attached to wing w heel lift bracket 163 and through a hole at the bottom of the wheel tucking lever 164 forming a pivot. At the top of the wheel tucking lever 164 is another hole where the butt end of the trailing wheel hydraulic cylinder 156 is attached by pin 159. The ram end of the trailing wheel hydraulic cylinder 156 is attached to a plate or plates of steel extending vertically from the trailing wheel arm 155 by pin 158 which extends through holes in the plates of steel and through the yoke or sleeve 170 at the end of the ram. (FIGS. 17 A-C)

The inboard bottom end of the trailing wheel arm 155 is attached by and pivots on pin 157 which extends through holes in the outboard ends of the wing wheel lift bracket 163 and in a round sleeve 169 attached to trailing wheel arm 155. This allows the trailing wheel arm 155 a vertical arc perpendicular to the wing frame 25, 26.

At the outboard end of the trailing wheel arm 155 is a round sleeve 148 which is attached in a way that the vertical caster shaft 146 extends through the round sleeve 148 and is for the most part straight up and down when the wing 25, 26 is in the up working position. Like the leading caster wheel 141 the trailing wheel 142 can swivel 360 degrees in either direction.

The leading and trailing wheel 141, 142 run in the same path in a straight route of travel reducing the total width of wheel tracks and also reduces the amount of drag caused by wheels running in loose soil.

The hydraulic cylinders leading 154 and trailing 156 receive hydraulic oil from the ram side of the right or left main lift cylinder 67,68. This hydraulic oil is trapped and flows in and out of the butt ends of the leading 154 and trailing 156 hydraulic cylinders. In these illustrations, the bore and stroke of the hydraulic cylinder 154, 156 are different sizes, but the volume of hydraulic oil it takes to move the leading and trailing wheels 141, 142 is the same. In the working positions up or down on level ground the rams of neither the leading or trailing hydraulic cylinders 154, 156 are fully retracted or extended. This allows for movement of the wheels up and down so to traverse uneven ground keeping the wing frame 25, 26 from being jarred or bounced over bumps. When the leading wheel 141 rolls over a rock or bump, hydraulic oil is displaced from the leading hydraulic cylinder 154 to the butt end of the trailing hydraulic cylinder 156 and it moves down the same amount that the leading wheel 141 moves up. It works a similar way when the lead wheel 141 passes through a hole or dip because this puts more pressure on the trailing wheel, it pushes the ram in and displaces oil from the butt of the trailing hydraulic cylinder 156 to the leading wheel hydraulic cylinder 154 because of the reduced pressure in the hydraulic cylinder 154. All this creates a hydraulic walking tandem type situation.

The unique operation of this wing wheel lift assembly is the wheel tucking for transportation in the stacked position (FIGS. 9 & 17D). In the working position (FIGS. 17A & B) the wheel tucking lever 164 is held against the stop adjustment bolt 166 by the pressure of the trailing wheel arm 155. This pressure, caused by leverage, holds the inboard bracket 152 of the leading wheel assembly in a vertical position by pressure transfer from the wheel tucking lever 164 to the wheel tucking link arm 165.

When the wing frames 25, 26 are being stacked, the pressure is taken off the wheels as the wing frame rises. The trailing wheel arm swings down and in pulling the wheel tucking arm 164 back. At the same time this pulls the inboard bracket 152 back and up. This causes the lead caster wheel 141 to be tucked under the wing frame 25, 26 (FIG. 17D). This may also create a suction effect by further pulling the leading wheel hydraulic cylinder 154 in because the weight of the trailing wheel will pull the ram of the trailing wheel hydraulic cylinder 156 out, creating a need for additional hydraulic oil in the butt side of the hydraulic cylinder which should suck the oil out of the butt end of the leading wheel hydraulic cylinder 154.

In unstacking, the trailing wheel 142 makes contact with the ground first. As the wing frame 25, 26 gets closer to the ground the trailing wheel arm 155 pushes the ram of the trailing wheel hydraulic cylinder 156 in, displacing oil to the leading wheel hydraulic cylinder (154 also pushing the wheel tucking lever 164 inward towards the stop bolt 166. This through the wheel tucking link arm 165 pushes the inboard bracket 152 of the leading wheel assembly down and forward back to the vertical position.

This frame design is not limited to a utility cart, more so a tracked or belted cart, though due to the ability of the tracked vehicle to carry large loads, a tracked utility cart was used in all of the drawings. In FIG. 18 a plain top view of the cart shows the left side (as determined by viewing from the rear looking in the direction of travel) with the belts cut out so that the front 122A&B, rear 123A& B and idler 124A-H wheels can be shown. The right side is a minor image of the left. Also shown are the front hubs 101A&B, rear hubs 103A&B and idler hubs 102A-H. The hubs run on shafts that have spindles machined on both ends to form a short axle. FIG. 19A shows a close up view of the front axle spindle 112, which extends through holes or round sleeve 116A in the top left tandem arm 120. This top tandem arm 120 is parallel with the cart frame 66 and pivots on pin 111, which extends through a round sleeve 11 0 or holes. The rear of the front top tandem arm 120 extends down to another pivot formed by pin 129 and round sleeve 115. (FIG. 19A). Pin 129, 129A extends through holes in steel plates that extend up from the left front lower tandem arm 118 and then through round sleeve 115 in the bottom of the front top tandem ann.

Figure 24:
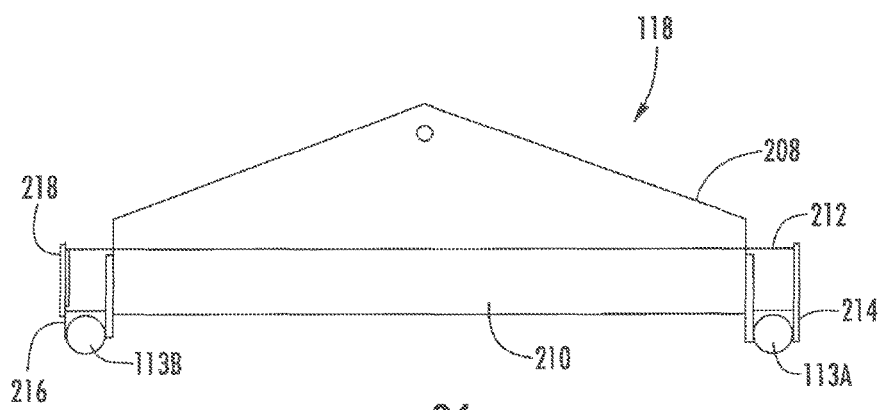
FIG. 24 is side view of a preferred embodiment of a lower tandem arm that accommodates both pitch and roll changes.

A preferred design for the lower tandem arms 118, 119 is shown in FIG. 24. Each tandem arm includes an upper portion 208 that pivotally mounts to the top tandem arms 120, 121. Attached below the upper portion 208 is an outer roll tube 210. An inner roll tube 212 slides into the outer roll tube 210, and is free to rotate within the outer tube 210. A first axle attachment member 214 is fixedly attached to one end of the inner roll tube 212, as by welding. A second axle attachment member 216 is pivotally attached to the opposite end of the inner roll tube 212, and held in place by end cap 218, so that the first and second axle attachment members 214, 216 can pivot with respect to each other about the axis of the inner roll tube 212. Idler hub spindle axles 113A&B are attached to the first and second axle attachment members 214, 216.

An alternative design for the tandem arms 118, 119, which does not allow for roll along a longitudinal axis is also possible. According to this simpler design, at each end of the front lower tandem arm 118 are holes or round sleeves (117 A&B which the idler hub spindle axles 113A&B extend through. The rear lower tandem arm 119 is identical to the front lower tandem arm 118 using round sleeves 117C&D and idler hub spindle axles 113C&D.

The left rear top tandem arm 121 and rear lower tandem arm 119 are connected at pivot formed by pin 129B and round sleeve 115B. The left rear top tandem arm 121 also like the front top tandem arm 120 pivots on pin 111 which extends through round sleeve 137. At the opposite end from round sleeve 115B in the left rear top tandem arm is round sleeve 116B which the left rear hub spindle axle 138 extends through. All of the before mentioned pivots follow the arms to move in the same vertical plane (FIGS. 20 & 21) which runs parallel to cart frame 66. This allows for the inner sides of the pairs of wheels front 122A & B, rear 123A & B, idlers 124A & B, 124C & D, 124E & F, 124G & H to form guides for the guide blocks 139A-D (FIGS. 20 & 21) which are aligned down the center and all the way around the inside of the belts which is somewhat standard on belts.

Because of the multiple pivot in the vertical plane the pairs of wheels can move up and down traversing the ground with more equal weight distribution and still guide the belts.

Figure 23:
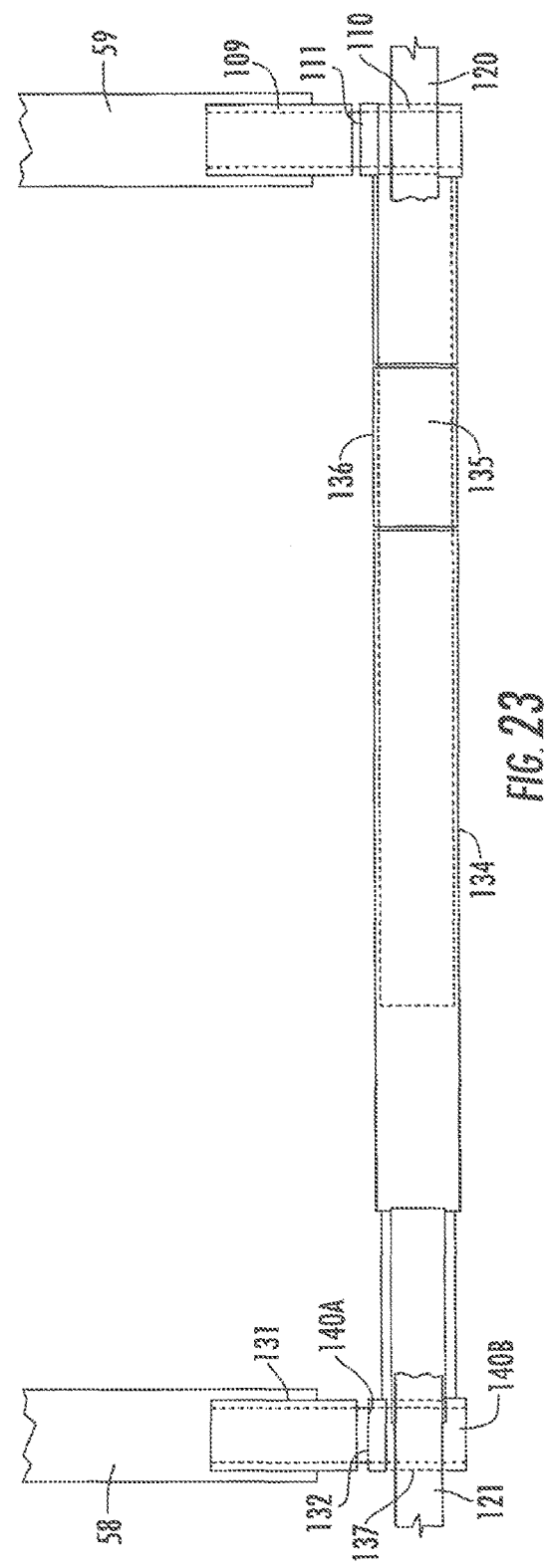
FIG. 23 is a top close up view of belt tension tube.

The top tandem arms 120, 121 are connected to the main cart pivot axles, front 59 and rear 58 by pins 111 and 132. Both pins are held in round sleeves, front 109 and rear 131. A bolt or pin may be placed in a hole drilled through the pin and sleeve or pin 111 and pin 13 2 may be directly fastened to the main cart pivot axles 58, 59. FIG. 23 shows top view, FIGS. 20 and 21 show front and back elevation.

The cart frame rails 65, 66 can be attached in many different ways such as bolt or welded to main cart pivot axles 58, 59 or bolted indirectly so to use load cells for a weigh scale. The method that will be described and illustrated uses additional pivots to allow for smoother load transporting in uneven terrain. Also this design allows the same weight to be transferred to or from the draw bar of the vehicle pulling it by moving the front frame pivot assemblies 127, 128 forward or backward on the adjustable hitch load plates 125, 126.

Figure 22:
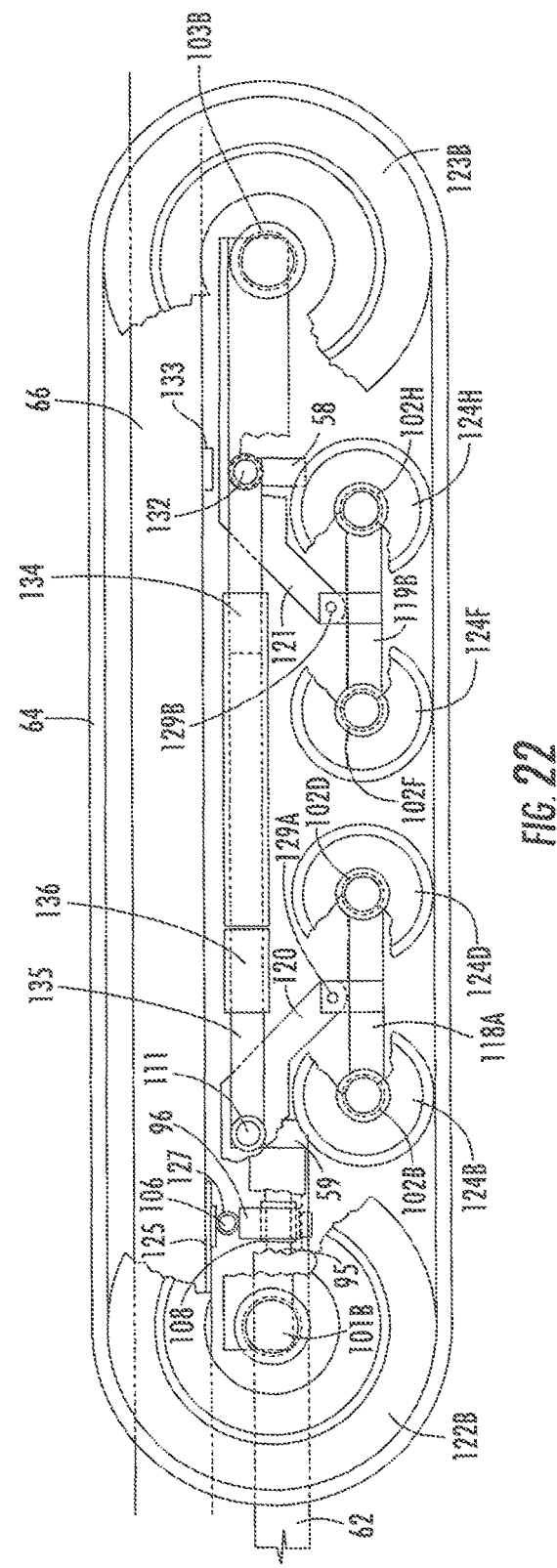
FIG. 22 is a side elevation of utility cart.

The adjustable hitch load plates 125, 126 have holes drilled in them so to allow the front frame pivot assembly 127, 128 to be bolted in incremental positions but staying perpendicular to main cart frame rail 65, 66. (FIGS. 19 & 20) The front frame pivot assemblies 127, 128 are connected to the front load pivot assembly 96 by pin 106, 107 forming a pivot in round sleeve in the front frame pivot assemblies 127, 128. These round sleeves are perpendicular to the main cart frame rails 65, 66. The pins 106, 107 also extend through round sleeves 104, 105 which may be drilled and bolted securing the pins 106, 107. It would possible to substitute a single long rod for pins 106 and 107. The pins 106, 107 may be fastened directly to the front load pivot assembly 96 (FIGS. 19 & 20). The side elevation in FIG. 22 also shows all of this in a cut away view.

The front load pivot assembly 96 can slide forward and backward on the front slide pivot axle 95. In this design the pull is transferred from the hitch 62 to the front main pivot axle 59 to the front top tandem arm 120 to the front wheels 122A, B which pull the belts 63, 64 and the rest of the cart rides on the belts 63, 64. This helps the belts to track or guide easier. This is not totally necessary and may be designed differently.

The front slide pivot axle 95 extends through a hole or round sleeve 94 in the hitch cross member 100 and round sleeve 108 in the front load pivot assembly 96 and into a hole or round sleeve 93 attached to front main cart pivot axle 59. The front slide pivot axle 95 is centered between and parallel to the main cart frame rails 65, 66 (FIG. 19). This design permits the weight distribution to be adjusted between the cart and the pulling vehicle. By adjusting the location of the front frame pivot assemblies 127, 128 forward or rearward on the adjustable hitch load plates 125, 126, the distribution of the weight can be shifted forward or rearward. As an alternative, it would be possible to add an additional cross member (not shown) to the hitch 62, similar to cross member 100, and mount the front slide pivot axle 95 between the two cross members instead of between cross member 100 and the front main cart pivot axle 59.

The hitch 62 (which can be varied in length) is attached to the front main cart pivot axle 59 and extends forward. Illustrated in FIGS. 18 & 19 is the adjustable length hitch, where an outside hitch tube 97 is incorporated in the design of the hitch 62 and internal hitch tube 98 can be extended or retracted to different lengths.

The rear main cart pivot axle 58 can be attached in many ways to the main cart frame rails 65, 66. If using a design similar to this and using a front pivot, the main frame rails 65, 66 should be mounted in a ridged way. Shown in FIG. 21 a frame cross member 133 helps support the main cart frame rails 65, 66.

FIG. 23 illustrates a necessity of design which is a belt tension assembly. This may be designed in a different way and placed in a different position. It serves to keep tension on the belts and to keep them guided between the wheels of the carriage. It should extend between the front and rear main cart pivot axles 58, 59. This illustration and design shows arms (plates of steel) extending from a round tube, and pin 132 extending through holes in the plate or round sleeve 140A & B. This assembly is the external belt tension tube 134. In the same manner, the internal belt tension tube 135 is built and pivots in hole or round sleeves on pin 111 which is attached to the front main cart pivot axle 59. The arms of both the internal and external belt tension tubes 135, 134 straddle the front and rear top tandem arms 120, 121. These tension tubes 134, 135 do not have to straddle the top tandem arms 120, 121 and may be placed on either side and may be pinned directly to the front and rear main cart pivot axles 58, 59.

When the belts are tensioned, a clamp 136 or some type of stop must be placed on the section of internal tension tube 135 sticking out of or past the end of the external tension tube 134. These tubes must be able to rotate inside each other to allow for the uneven movement up and down of the main cart pivot axles 58, 59.

This cart design could be built using only one top and bottom tandem arm or two top and one bottom tandem arms with a single axle attached at the bottom of the top tandem arm. This would allow for a shorter cart base. When using only one top and bottom tandem arm, one main cart pivot axle would extend out and attach to a hub and spindle which would attach to both the inboard and outboard (front or back) wheels.

What is claimed is:

1. A track assembly for a vehicle, the track assembly comprising:
   a track comprising a ground-engaging outer surface, an inner surface opposite to the ground-engaging outer surface, a first lateral edge, and a second lateral edge, the track including flexible material extending to the ground-engaging outer surface, the inner surface, the first lateral edge, and the second lateral edge, the track comprising a wheel-contacting projection that projects from the inner surface and comprises part of the flexible material; and
   a plurality of track-contacting wheels to guide the track around the track-contacting wheels, the flexible material of the track flexing around the track-contacting wheels, the track-contacting wheels including:
      a leading wheel and a trailing wheel spaced from one another in a longitudinal direction of the track assembly; and
      a plurality of support wheels for rolling on a lower run of the track and disposed between the leading wheel and the trailing wheel in the longitudinal direction of the track assembly, wherein: each support wheel is pivotable about a pivot axis transversal to a widthwise direction of the track assembly; a first one of the support wheels and a second one of the support wheels are spaced from one another in the longitudinal direction of the track assembly and pivotable relative to one another about the pivot axis; and respective ones of the support wheels are spaced apart in the widthwise direction of the track by a space configured to receive the wheel-contacting projection of the track.

2. The track assembly of claim 1, wherein the pivot axis is generally parallel to the longitudinal direction of the track assembly.

3. The track assembly of claim 1, wherein a third one of the support wheels is spaced from the first one of the support wheels and the second one of the support wheels in the longitudinal direction of the track assembly and pivotable relative to the first one of the support wheels and the second one of the support wheels about the pivot axis.

4. The track assembly of claim 3, wherein a fourth one of the support wheels is spaced from the first one of the support wheels, the second one of the support wheels, and the third one of the support wheels in the longitudinal direction of the track assembly and pivotable relative to the first one of the support wheels, the second one of the support wheels, and the third one of the support wheels about the pivot axis.

5. The track assembly of claim 1, wherein: a third one of the support wheels is spaced from the first one of the support wheels in the widthwise direction of the track assembly; the third one of the support wheels is pivotable about the pivot axis together with the first one of the support wheels; and the third one of the support wheels and the second one of the support wheels are pivotable relative to one another about the pivot axis.

6. The track assembly of claim 5, wherein: a fourth one of the support wheels is spaced from the second one of the support wheels in the widthwise direction of the track assembly; the fourth one of the support wheels is pivotable about the pivot axis together with the second one of the support wheels; and the fourth one of the support wheels and the first one of the support wheels are pivotable relative to one another about the pivot axis.

7. The track assembly of claim 3, wherein: a fourth one of the support wheels is spaced from the first one of the support wheels in the widthwise direction of the track assembly; the fourth one of the support wheels is pivotable about the pivot axis together with the first one of the support wheels; and the fourth one of the support wheels and the second one of the support wheels are pivotable relative to one another about the pivot axis.

8. The track assembly of claim 7, wherein: a fifth one of the support wheels is spaced from the second one of the support wheels in the widthwise direction of the track assembly; the fifth one of the support wheels is pivotable about the pivot axis together with the second one of the support wheels; and the fifth one of the support wheels and the first one of the support wheels are pivotable relative to one another about the pivot axis.

9. The track assembly of claim 8, wherein: a sixth one of the support wheels is spaced from the third one of the support wheels in the widthwise direction of the track assembly; the sixth one of the support wheels is pivotable about the pivot axis together with the third one of the support wheels; and the sixth one of the support wheels, the first one of the support wheels and the second one of the support wheels are pivotable relative to one another about the pivot axis.

10. The track assembly of claim 1, wherein: the pivot axis is a first pivot axis; and each of the first one of the support wheels and the second one of the support wheels is pivotable about a second pivot axis transversal to the longitudinal direction of the track assembly and spaced from an axis of rotation of the first one of the support wheels and an axis of rotation of the second one of the support wheels.

11. The track assembly of claim 10, wherein the second pivot axis is generally parallel to the widthwise direction of the track assembly.

12. The track assembly of claim 10, comprising a tandem member carrying the first one of the support wheels and the second one of the support wheels and pivotable about the second pivot axis.

13. The track assembly of claim 10, wherein the second pivot axis is disposed between the axis of rotation of the first one of the support wheels and the axis of rotation of the second one of the support wheels in the longitudinal direction of the track assembly.

14. The track assembly of claim 13, wherein the second pivot axis is disposed above the axis of rotation of the first one of the support wheels and the axis of rotation of the second one of the support wheels in a heightwise direction of the track assembly.

15. The track assembly of claim 1, wherein the pivot axis is spaced from an axis of rotation of the support wheel in a heightwise direction of the track assembly.

16. The track assembly of claim 15, wherein the pivot axis is above the axis of rotation of the support wheel in the heightwise direction of the track assembly.

17. The track assembly of claim 5, wherein: the first one of the support wheels occupies at least a majority of a dimension of the inner surface of the track from the wheel-contacting projection to the first lateral edge of the track; and the third one of the support wheels occupies at least a majority of a dimension of the inner surface of the track from the wheel-contacting projection to the second lateral edge of the track.

18. The track assembly of claim 1, wherein each of the leading wheel and the trailing wheel is larger in diameter than each of the support wheels.

19. The track assembly of claim 1, wherein the vehicle is a cart configured for connection to a tractor.

20. The track assembly of claim 1, wherein the vehicle is an agricultural vehicle.

21. A vehicle comprising the track assembly of claim 1.

22. The vehicle of claim 21, wherein the vehicle is a cart configured for connection to a tractor.

23. The vehicle of claim 21, wherein the vehicle is an agricultural vehicle.

24. A track assembly for a vehicle, the track assembly comprising:
   a track comprising a ground-engaging outer surface, an inner surface opposite to the ground-engaging outer surface, a first lateral edge, and a second lateral edge, the track including flexible material extending to the ground-engaging outer surface, the inner surface, the first lateral edge, and the second lateral edge, the track comprising a wheel-contacting projection that projects from the inner surface and comprises part of the flexible material; and
   a plurality of track-contacting wheels to guide the track around the track-contacting wheels, the flexible material of the track flexing around the track-contacting wheels, the track-contacting wheels including:
      a leading wheel and a trailing wheel spaced from one another in a longitudinal direction of the track assembly; and
      a plurality of support wheels for rolling on a lower run of the track and disposed between the leading wheel and the trailing wheel in the longitudinal direction of the track assembly, wherein: respective ones of the support wheels that are spaced from one another in the longitudinal direction of the track assembly are pivotable independently from one another about a pivot axis transversal to a widthwise direction of the track assembly; and adjacent ones of the support wheels are spaced apart in the widthwise direction of the track by a space configured to receive the wheel-contacting projection of the track.

25. A track assembly for a vehicle, the track assembly comprising:
   a track comprising a ground-engaging outer surface, an inner surface opposite to the ground-engaging outer surface, a first lateral edge, and a second lateral edge, the track including flexible material extending to the ground-engaging outer surface, the inner surface, the first lateral edge, and the second lateral edge, the track comprising a wheel-contacting projection that projects from the inner surface and comprises part of the flexible material; and
   a plurality of track-contacting wheels to guide the track around the track-contacting wheels, the flexible material of the track flexing around the track-contacting wheels, the track-contacting wheels including:
      a leading wheel and a trailing wheel spaced from one another in a longitudinal direction of the track assembly; and
      a plurality of support wheels for rolling on a lower run of the track and disposed between the leading wheel and the trailing wheel in the longitudinal direction of the track assembly, wherein the support wheels are movable to allow the flexible material of the lower run of the track to bend beneath the support wheels on uneven terrain; each support wheel is pivotable about a pivot axis transversal to a widthwise direction of the track assembly; and respective ones of the support wheels are spaced apart in the widthwise direction of the track by a space configured to receive the wheel-contacting projection of the track.

26. The track assembly of claim 25, wherein the pivot axis is generally parallel to the longitudinal direction of the track assembly.

27. The track assembly of claim 25, wherein a first one of the support wheels and a second one of the support wheels are spaced from one another in the longitudinal direction of the track assembly and pivotable relative to one another about the pivot axis.

28. The track assembly of claim 27, wherein a third one of the support wheels is spaced from the first one of the support wheels and the second one of the support wheels in the longitudinal direction of the track assembly and pivotable relative to the first one of the support wheels and the second one of the support wheels about the pivot axis.

29. The track assembly of claim 28, wherein a fourth one of the support wheels is spaced from the first one of the support wheels, the second one of the support wheels, and the third one of the support wheels in the longitudinal direction of the track assembly and pivotable relative to the first one of the support wheels, the second one of the support wheels, and the third one of the support wheels about the pivot axis.

30. The track assembly of claim 25, wherein a first one of the support wheels and a second one of the support wheels are spaced from one another in the widthwise direction of the track assembly and are pivotable together about the pivot axis.

31. The track assembly of claim 30, wherein a third one of the support wheels and a fourth one of the support wheels are spaced from one another in the widthwise direction of the track assembly, spaced from the first one of the support wheels and the second one of the support wheels in the longitudinal direction of the track assembly, and pivotable together about the pivot axis.

32. The track assembly of claim 31, wherein: the first one of the support wheels and the third one of the support wheels are pivotable relative to one another about the pivot axis; and the second one of the support wheels and the fourth one of the support wheels are pivotable relative to one another about the pivot axis.

33. The track assembly of claim 31, wherein a fifth one of the support wheels and a sixth one of the support wheels are spaced from one another in the widthwise direction of the track assembly, spaced from the first one of the support wheels, the second one of the support wheels, the third one of the support wheels, and the fourth one of the support wheels in the longitudinal direction of the track assembly, and pivotable together about the pivot axis.

34. The track assembly of claim 33, wherein: the first one of the support wheels, the third one of the support wheels, and the fifth one of the support wheels are pivotable relative to one another about the pivot axis; and the second one of the support wheels, the fourth one of the support wheels, and the sixth one of the support wheels are pivotable relative to one another about the pivot axis.

35. The track assembly of claim 27, wherein: the pivot axis is a first pivot axis; and each of the first one of the support wheels and the second one of the support wheels is pivotable about a second pivot axis transversal to the longitudinal direction of the track assembly and spaced from an axis of rotation of the first one of the support wheels and an axis of rotation of the second one of the support wheels.

36. The track assembly of claim 35, wherein the second pivot axis is generally parallel to the widthwise direction of the track assembly.

37. The track assembly of claim 35, comprising a tandem member carrying the first one of the support wheels and the second one of the support wheels and pivotable about the second pivot axis.

38. The track assembly of claim 35, wherein the second pivot axis is disposed between the axis of rotation of the first one of the support wheels and the axis of rotation of the second one of the support wheels in the longitudinal direction of the track assembly.

39. The track assembly of claim 38, wherein the second pivot axis is disposed above the axis of rotation of the first one of the support wheels and the axis of rotation of the second one of the support wheels in a heightwise direction of the track assembly.

40. The track assembly of claim 25, wherein the pivot axis is spaced from an axis of rotation of the support wheel in a heightwise direction of the track assembly.

41. The track assembly of claim 40, wherein the pivot axis is above the axis of rotation of the support wheel in the heightwise direction of the track assembly.

42. The track assembly of claim 30, wherein: the first one of the support wheels occupies at least a majority of a dimension of the inner surface of the track from the wheel-contacting projection to the first lateral edge of the track; and the second one of the support wheels occupies at least a majority of a dimension of the inner surface of the track from the wheel-contacting projection to the second lateral edge of the track.

43. The track assembly of claim 25, wherein each of the leading wheel and the trailing wheel is larger in diameter than each of the support wheels.

44. The track assembly of claim 25, wherein the vehicle is a cart configured for connection to a tractor.

45. The track assembly of claim 25, wherein the vehicle is an agricultural vehicle.

46. A vehicle comprising the track assembly of claim 25.

47. The vehicle of claim 46, wherein the vehicle is a cart configured for connection to a tractor.

48. The vehicle of claim 46, wherein the vehicle is an agricultural vehicle.

49. A track assembly for a vehicle, the track assembly being mountable to a frame of the vehicle, the track assembly comprising:
- a track comprising a ground-engaging outer surface, an inner surface opposite to the ground-engaging outer surface, a first lateral edge, and a second lateral edge, the track including flexible material extending to the ground-engaging outer surface, the inner surface, the first lateral edge, and the second lateral edge, the track comprising a wheel-contacting projection that projects from the inner surface and comprises part of the flexible material;
- a plurality of wheels that engage the inner surface of the track; and
- at least one pivot defining a pivot axis transversal to a widthwise direction of the track assembly;
- wherein: the flexible material of the track flexes around the track assembly; the wheels are pivotable relative to the frame of the vehicle about the pivot axis; and respective ones of the wheels are spaced apart in the widthwise direction of the track assembly by a space configured to receive the wheel-contacting projection of the track.

50. The track assembly of claim 49, wherein the pivot axis is generally parallel to a longitudinal direction of the track assembly.

51. The track assembly of claim 49, wherein a first one of the wheels and a second one of the wheels are spaced from one another in a longitudinal direction of the track assembly.

52. The track assembly of claim 51, wherein the first one of the wheels and the second one of the wheels are pivotable relative to one another about the pivot axis.

53. The track assembly of claim 49, wherein a first one of the wheels and a second one of the wheels are spaced from one another in the widthwise direction of the track assembly.

54. The track assembly of claim 53, wherein the first one of the wheels and the second one of the wheels are pivotable together about the pivot axis.

55. The track assembly of claim 54, wherein a third one of the wheels and a fourth one of the wheels are spaced from one another in the widthwise direction of the track assembly, spaced from the first one of the wheels and the second one of the wheels in the longitudinal direction of the track assembly, and pivotable together about the pivot axis.

56. The track assembly of claim 55, wherein: the first one of the wheels and the third one of the wheels are pivotable relative to one another about the pivot axis; and the second one of the wheels and the fourth one of the wheels are pivotable relative to one another about the pivot axis.

57. The track assembly of claim 49, wherein: the pivot axis is a first pivot axis; and a given one of the wheels is pivotable about a second pivot axis transversal to a longitudinal direction of the track assembly and spaced from an axis of rotation of the given one of the wheels.

58. The track assembly of claim 57, wherein the second pivot axis is generally parallel to the widthwise direction of the track assembly.

59. The track assembly of claim 49, wherein: the wheels are support wheels for rolling on a lower run of the track; the track assembly comprises a leading wheel and a trailing wheel spaced from one another in a longitudinal direction of the track assembly; and the support wheels are disposed between the leading wheel and the trailing wheel in the longitudinal direction of the track assembly.

60. The track assembly of claim 59, wherein a first one of the support wheels and a second one of the support wheels are spaced from one another in the longitudinal direction of the track assembly.

61. The track assembly of claim 60, wherein the first one of the support wheels and the second one of the support wheels are pivotable relative to one another about the pivot axis.

62. The track assembly of claim 59, wherein a first one of the support wheels and a second one of the support wheels are spaced from one another in the widthwise direction of the track assembly and are pivotable together about the pivot axis.

63. The track assembly of claim 62, wherein a third one of the support wheels and a fourth one of the support wheels are spaced from one another in the widthwise direction of the track assembly, spaced from the first one of the support wheels and the second one of the support wheels in the longitudinal direction of the track assembly, and pivotable together about the pivot axis.

64. The track assembly of claim 63, wherein: the first one of the support wheels and the third one of the support wheels are pivotable relative to one another about the pivot axis; and the second one of the support wheels and the fourth one of the support wheels are pivotable relative to one another about the pivot axis.

65. The track assembly of claim 59, wherein: the pivot axis is a first pivot axis; and a given one of the support wheels is pivotable about a second pivot axis transversal to the longitudinal direction of the track assembly and spaced from an axis of rotation of the given one of the support wheels.

66. The track assembly of claim 65, wherein the second pivot axis is generally parallel to the widthwise direction of the track assembly.

67. The track assembly of claim 65, comprising a tandem member carrying the given one of the support wheels and an adjacent one of the support wheels and pivotable about the second pivot axis.

68. The track assembly of claim 65, wherein the second pivot axis is disposed between the axis of rotation of the given one of the support wheels and an axis of rotation of an adjacent one of the support wheels that is spaced from the given one of the support wheels in the longitudinal direction of the track assembly.

69. The track assembly of claim 65, wherein the second pivot axis is disposed above the axis of rotation of the given one of the support wheels in a heightwise direction of the track assembly.

70. The track assembly of claim 49, wherein the pivot axis is spaced from an axis of rotation of each of the wheels in a heightwise direction of the track assembly.

71. The track assembly of claim 70, wherein the pivot axis is above the axis of rotation of each of the wheels in the heightwise direction of the track assembly.

72. The track assembly of claim 54, wherein: the first one of the wheels occupies at least a majority of a dimension of the inner surface of the track from the wheel-contacting projection to the first lateral edge of the track; and the second one of the wheels occupies at least a majority of a dimension of the inner surface of the track from the wheel-contacting projection to the second lateral edge of the track.

73. The track assembly of claim 59, wherein each of the leading wheel and the trailing wheel is larger in diameter than each of the support wheels.

74. The track assembly of claim 49, wherein the at least one pivot comprises an outer roll member and an inner roll member rotatable within and relative to the outer roll member.

75. The track assembly of claim 74, wherein the outer roll member is an outer roll tube and the inner roll member is an inner roll tube.

76. The track assembly of claim 49, wherein a lower run of the track extends under the wheels and an upper run of the track extends above the wheels and is substantially parallel to the lower run of the track.

77. The track assembly of claim 49, wherein the vehicle is a cart configured for connection to a tractor.

78. The track assembly of claim 49, wherein the vehicle is an agricultural vehicle.

79. A vehicle comprising the track assembly of claim 49.

80. The vehicle of claim 79, wherein the vehicle is a cart configured for connection to a tractor.

81. The vehicle of claim 79, wherein the vehicle is an agricultural vehicle.

* * * * *